(12) United States Patent
Tabuchi et al.

(10) Patent No.: US 10,717,489 B2
(45) Date of Patent: Jul. 21, 2020

(54) RESIN-MADE TANK

(71) Applicant: HONDA MOTOR CO., LTD., Tokyo (JP)

(72) Inventors: Daisuke Tabuchi, Wako (JP); Tomoyuki Matsumura, Wako (JP); Yuki Mizukura, Wako (JP); Tasuku Yamaguchi, Wako (JP); Ko Kurata, Wako (JP); Hikaru Yokomura, Wako (JP); Keigo Mine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 16/131,369

(22) Filed: Sep. 14, 2018

(65) Prior Publication Data

US 2019/0092413 A1    Mar. 28, 2019

(30) Foreign Application Priority Data

Sep. 28, 2017  (JP) .................................. 2017-188799

(51) Int. Cl.
*B62J 35/00* (2006.01)
*B29C 45/14* (2006.01)
*B29L 31/00* (2006.01)

(52) U.S. Cl.
CPC ......... *B62J 35/00* (2013.01); *B29C 45/14221* (2013.01); *B29L 2031/7172* (2013.01)

(58) Field of Classification Search
CPC ........ B62J 35/00; B29L 2031/00–7172; B29C 45/14221; B65D 83/00; B65D 88/748;
(Continued)

(56) References Cited

U.S. PATENT DOCUMENTS 3,435,896 A * 4/1969 Williams ................ E21B 33/00
                                                         166/75.11
3,772,760 A * 11/1973 Zlotek ................... B29C 65/565
                                                         29/469.5
(Continued)

FOREIGN PATENT DOCUMENTS

JP         3301083 B2      7/2002
JP         4345239 B2     10/2009
JP      2016-016698        2/2016

OTHER PUBLICATIONS

Indian Office Action dated Nov. 29, 2019 with English Text, 5 pages.

*Primary Examiner* — Kareen K Thomas
(74) *Attorney, Agent, or Firm* — Rankin, Hill & Clark LLP

(57) ABSTRACT

A resin-made tank includes a mouthpiece capable of covering an inner peripheral surface, a distal end surface and an outer peripheral surface of the cylindrical filling portion, wherein a fuel tank body has a mouthpiece fixing portion to which a mouthpiece fixing jig is fixed. The mouthpiece has an annular skirt portion that covers the outer peripheral surface. The skirt portion has a fitting portion that is fitted on an upper portion of the outer peripheral surface on an upper portion of the skirt portion, and has a large diameter portion having a larger diameter than the fitting portion on a lower portion of the skirt portion. The mouthpiece has a stay portion extending radially outward of the mouthpiece from the large diameter portion, and a fixing hole, through which the mouthpiece fixing jig passes, is provided in the stay portion.

9 Claims, 18 Drawing Sheets

(58) Field of Classification Search
CPC ...... B65D 88/128; B65D 88/54; B60K 15/04; B60K 2015/0458
USPC ........ 220/562–564, 560–560.15, 565–567.3; 222/462; 141/350, 331, 346
See application file for complete search history.

(56) References Cited

U.S. PATENT DOCUMENTS

| | | | | |
|---|---|---|---|---|
| 3,865,270 | A * | 2/1975 | Petersson | B65D 47/063 220/721 |
| 4,357,293 | A * | 11/1982 | Williamson, Jr. | B29C 33/14 264/275 |
| 4,813,453 | A * | 3/1989 | Jenkins | B60K 15/03504 137/588 |
| 6,860,398 | B2 * | 3/2005 | Potter | B29C 65/565 220/4.14 |
| 7,014,214 | B2 | 3/2006 | Kaneko | |
| 8,622,102 | B2 * | 1/2014 | Yager | B60K 15/04 141/350 |
| 2005/0045399 | A1 * | 3/2005 | Kudo | F02B 61/02 180/219 |
| 2005/0127078 | A1 * | 6/2005 | Vorenkamp | B29C 66/61 220/562 |
| 2006/0207928 | A1 * | 9/2006 | Morikawa | B01D 29/012 210/435 |
| 2010/0206802 | A1 * | 8/2010 | Sato | B01D 35/0273 210/490 |
| 2012/0074139 | A1 * | 3/2012 | Hisadomi | B60K 15/04 220/200 |

* cited by examiner

FIG.5
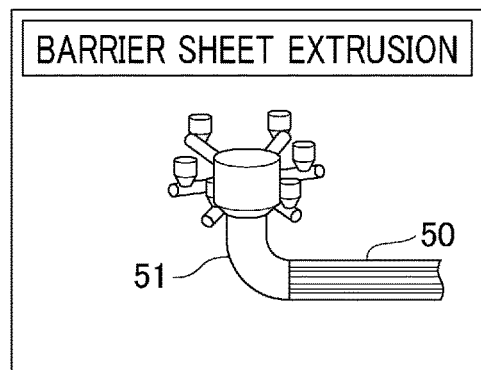
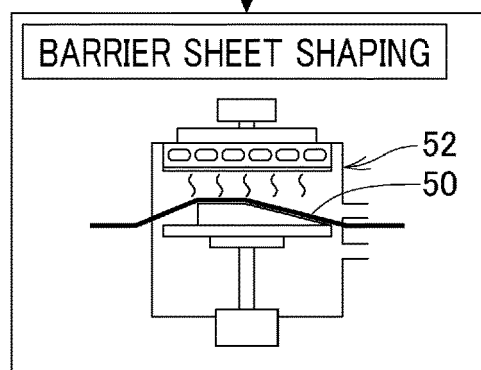
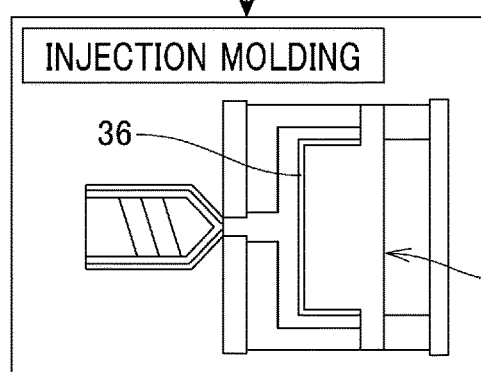
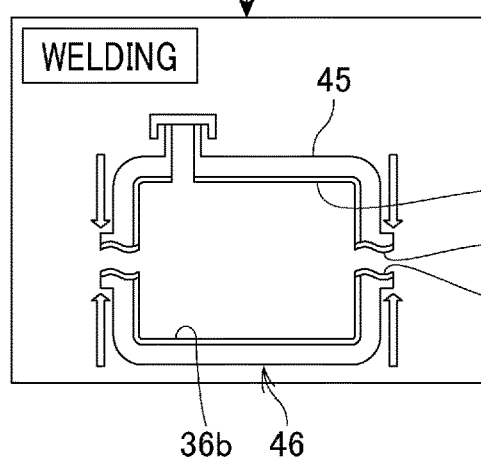

FIG.8
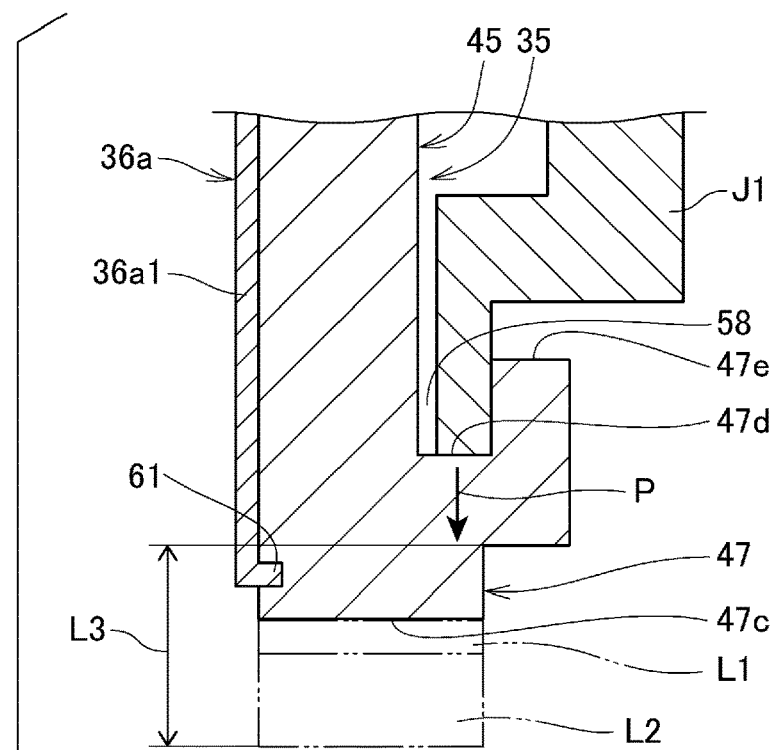
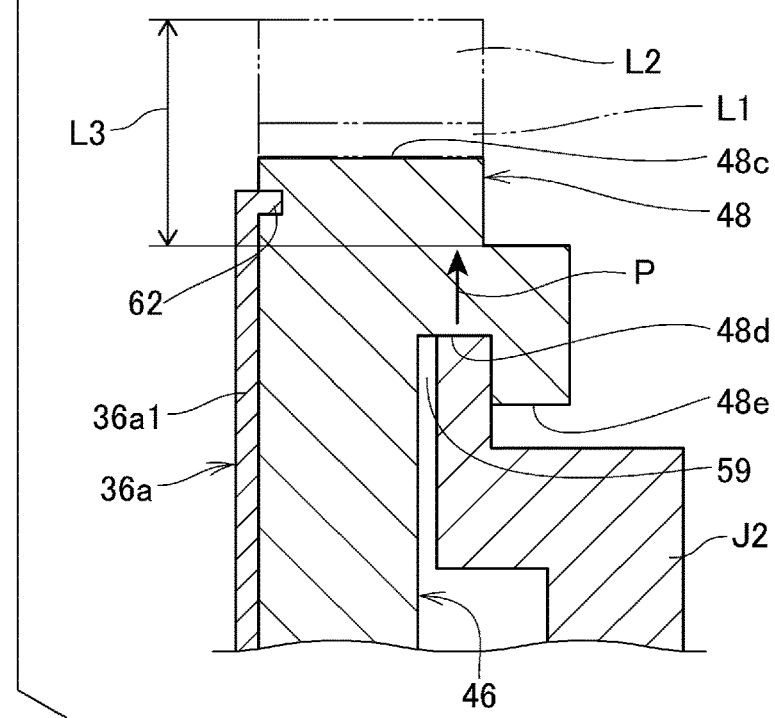

RESIN-MADE TANK

INCORPORATION BY REFERENCE

The present application claims priority under 35 U.S.C. § 119 to Japanese Patent Application No. 2017-188799 filed on Sep. 28, 2017. The content of the application is incorporated herein by reference in its entirety.

TECHNICAL FIELD

The present invention relates to a resin-made tank.

BACKGROUND ART

Conventionally, there has been known a resin-made tank which includes: a resin-made tank body; a resin-made cylindrical filling portion for liquid filling, the cylindrical filling portion provided on the tank body; a mouthpiece engageable with the cylindrical filling portion; and a seal member disposed between the mouthpiece and the cylindrical filling portion (see Patent Literature 1, for example). In Patent Literature 1, a clip portion positioned below the seal member is mounted on a lower end portion of the mouthpiece, and the mouthpiece is fixed by swaging the clip portion to an outer peripheral portion of the cylindrical filling portion.

CITATION LIST

Patent Literature

[Patent Literature 1] JP-A No. 2016-16698

SUMMARY OF INVENTION

Technical Problem

However, in the above-mentioned conventional resin-made tank, the mouthpiece is fixed by swaging and hence, a swaging step is necessary in the manufacture of the resin-made tank and, at the same time, mounting and removal of the mouthpiece at the time of maintenance or the like are difficult, and recycling of the removed mouthpiece is also difficult. Accordingly, it has been requested that the mouthpiece can be easily detachably mounted on the cylindrical filling portion. It has been also requested that the mouthpiece can be detachably mounted on the cylindrical filling portion while allowing an error in size in the manufacture of the cylindrical filling portion.

The present invention has been made in view of the above-mentioned circumstances, and it is an object of the present invention to provide a resin-made tank where a mouthpiece can be easily detachably mounted, and the mouthpiece can be mounted and removed while allowing an error in size in the manufacture of a cylindrical filling portion.

Solution to Problem

The present invention is directed to a resin-made tank including: a resin-made tank body (35); a resin-made cylindrical filling portion (40) for filling a liquid, the cylindrical filling portion (40) being provided on the tank body (35); and a mouthpiece (41) engageable with the cylindrical filling portion (40), and capable of covering an inner peripheral surface (93a), a distal end surface (93b) and an outer peripheral surface (93c) of the cylindrical filling portion (40). In the resin-made tank, the tank body (35) has a fixing portion (91) to which a fixing jig (42) for fixing the mouthpiece (41) to the tank body (35) is fixed, the mouthpiece (41) has an annular skirt portion (110) which covers the outer peripheral surface (93c), the skirt portion (110) has a fitting portion (115) which is fitted on an upper portion of the outer peripheral surface (93c) on an upper portion of the skirt portion (110), and has a large diameter portion (116) having a larger diameter than the fitting portion (115) on a lower portion of the skirt portion (110), the mouthpiece (41) has a stay portion (113) extending radially outward of the mouthpiece (41) from the large diameter portion (116), and a fixing hole (121) through which the fixing jig (42) passes is provided in the stay portion (113).

In the present invention, the fixing hole (121) may have a diameter larger than a diameter of the fixing jig (42) so as to allow movement of the mouthpiece (41) with respect to the cylindrical filling portion (40) by a predetermined distance in a radial direction of the cylindrical filling portion (40).

In the present invention, a barrier sheet layer (36) for lowering permeation of a fuel stored in the tank body (35) may be provided on an inner surface of the tank body (35), and the fixing portion (91) may be a nut (99) embedded in a surface of the tank body (35), and the fixing jig (42) may be a bolt (101) threadedly engageable with the nut (99), the nut (99) may be embedded in a protruding portion (98) which protrudes toward an inside of the tank body (35), and a distal end surface (98a) of the protruding portion (98) may have a semispherical convex shape.

Further, in the present invention, the at least one fixing portions (91) may include a plurality of the fixing portions (91) which are disposed concentrically around the cylindrical filling portion (40) at a substantially equal interval.

In the present invention, the mouthpiece (41) may have a rib (122) raised from a periphery of the stay portion (113), and the rib (122) may be formed continuously between a plurality of the fixing holes (121) disposed on a periphery of the skirt portion (110).

In the present invention, the large diameter portion (116) may have: a parallel portion (117) disposed parallel to the fitting portion (115); and an enlarged diameter portion (118) whose diameter is gradually increased from the fitting portion (115) to the parallel portion (117).

In the present invention, the cylindrical filling portion (40) may have a finished portion (90) finished by machining on a portion where the fitting portion (115) of the mouthpiece (41) is fitted.

In the present invention, the cylindrical filling portion (40) may have a proximal end portion (95) which is covered by the large diameter portion (116) of the mouthpiece (41), and an outer diameter of the proximal end portion (95) may be larger than an outer diameter of a portion, of the cylindrical filling portion (40), which is covered by the fitting portion (115).

Further, in the present invention, a seal member (92) may be interposed between the fitting portion (115) of the mouthpiece (41) and the outer peripheral surface (93c) of the cylindrical filling portion (40).

Advantageous Effects of Invention

A resin-made tank according to the present invention includes: a resin-made tank body; a resin-made cylindrical filling portion for filling a liquid, the cylindrical filling portion provided on the tank body; and a mouthpiece engageable with the cylindrical filling portion, and capable of covering an inner peripheral surface, a distal end surface and an outer peripheral surface of the cylindrical filling portion. The tank body has a fixing portion to which a fixing jig for fixing the mouthpiece to the tank body is fixed, the mouthpiece has an annular skirt portion which covers the outer peripheral surface, the skirt portion has a fitting portion which is fitted on an upper portion of the outer peripheral surface on an upper portion of the skirt portion, and has a large diameter portion having a larger diameter than the fitting portion on a lower portion of the skirt portion, the mouthpiece has a stay portion extending radially outward of the mouthpiece from the large diameter portion, and a fixing hole through which the fixing jig passes is provided in the stay portion.

With such a configuration, the mouthpiece engageable with the cylindrical filling portion is fixed to the fixing portion of the tank body by the fixing jig which passes through the fixing hole formed in the stay portion extending from the large diameter portion. Accordingly, the mouthpiece can be easily mounted on or removed from the cylindrical filling portion by mounting or removing the fixing jig. Further, the mouthpiece has the large diameter portion having the diameter larger than the diameter of the fitting portion and hence, the mouthpiece can be integrally moved with the stay portion by an amount corresponding to a gap formed between the large diameter portion and the outer peripheral surface of the cylindrical filling portion. Accordingly, even in the case where an error in size occurs in the manufacture of the cylindrical filling portion, the error can be absorbed by the movement of the mouthpiece. In this manner, the mouthpiece can be mounted or removed while allowing an error in size in the manufacture of the cylindrical filling portion.

In the present invention, the fixing hole may have a diameter larger than a diameter of the fixing jig so as to allow movement of the mouthpiece with respect to the cylindrical filling portion by a predetermined distance in a radial direction of the cylindrical filling portion. With such a configuration, the mouthpiece can be moved in a radial direction of the cylindrical filling portion by an amount that the fixing hole is movable with respect to the fixing jig. Accordingly, the mouthpiece can be mounted or removed while allowing an error in size in the manufacture of the cylindrical filling portion.

In the present invention, a barrier sheet layer for lowering permeation of a fuel stored in the tank body may be provided on an inner surface of the tank body, and the fixing portion may be a nut embedded in a surface of the tank body, and the fixing jig may be a bolt threadedly engageable with the nut, the nut may be embedded in a protruding portion which projects toward an inside of the tank body, and a distal end surface of the protruding portion may have a semispherical convex shape. With such a configuration, the distal end surface of the protruding portion has a semispherical convex shape and hence, it is possible to prevent the concentration of a stress on the barrier sheet layer provided on the distal end surface of the protruding portion and thereby a degree of freedom in arrangement of the fixing portion can be enhanced.

In the present invention, the at least of one fixing portion may include a plurality of the fixing portions which are disposed concentrically around the cylindrical filling portion at a substantially equal interval. With such a configuration, an external force which acts on the fixing portion can be effectively dispersed and hence, the concentration of a stress around the cylindrical filling portion can be reduced.

In the present invention, the mouthpiece may have a rib raised from a periphery of the stay portion, and the rib may be formed continuously between a plurality of the fixing holes disposed on a periphery of the skirt portion. With such a configuration, strength and rigidity of the mouthpiece can be enhanced and hence, the cylindrical filling portion can be effectively protected by the mouthpiece.

In the present invention, the large diameter portion may have: a parallel portion disposed parallel to the fitting portion; and an enlarged diameter portion whose diameter is gradually increased from the fitting portion to the parallel portion. With such a configuration, the large diameter portion has the parallel portion disposed parallel to the fitting portion and hence, a gap formed between the parallel portion and the outer peripheral surface of the cylindrical filling portion can be easily controlled. Further, rigidity of the skirt portion can be enhanced by the enlarged diameter portion and hence, the cylindrical filling portion can be effectively protected by the mouthpiece.

In the present invention, the cylindrical filling portion may have a finished portion finished by machining on a portion where the fitting portion of the mouthpiece is fitted. With such a configuration, the portion of the cylindrical filling portion on which the fitting portion of the mouthpiece is fitted can be worked with high accuracy by machining. An error in size which occurs in machining can be absorbed by the movement of the mouthpiece.

In the present invention, the cylindrical filling portion may have a proximal end portion which is covered by the large diameter portion of the mouthpiece, and an outer diameter of the proximal end portion may be larger than an outer diameter of a portion, of the cylindrical filling portion, which is covered by the fitting portion. With such a configuration, the proximal end portion of the cylindrical filling portion can have a large diameter corresponding to the large diameter portion of the mouthpiece and hence, strength and rigidity of the cylindrical filling portion can be enhanced.

In the present invention, a seal member may be interposed between the fitting portion of the mouthpiece and an outer peripheral surface of the cylindrical filling portion. With such a configuration, in the case where an error in size is absorbed by the movement of the mouthpiece, hermetic property between the fitting portion and the outer peripheral surface of the cylindrical filling portion can be ensured because of deflection of the seal member.

BRIEF DESCRIPTION OF DRAWINGS

FIG. 5 is a schematic view showing manufacturing steps of a fuel tank body.

FIG. 8 is a cross-sectional view showing a state before the upper half body and the lower half body are bonded to each other in FIG. 7.

DESCRIPTION OF EMBODIMENTS

Hereinafter, embodiments of the present invention are described with reference to drawings. In the description, directions of front and rear, left and right, and up and down are equal to directions of a vehicle body unless otherwise specified. In the respective drawings, symbol FR indicates a front side of the vehicle body, symbol UP indicates an upper side of the vehicle body, and symbol LH indicates a left side of the vehicle body.

Figure 1:
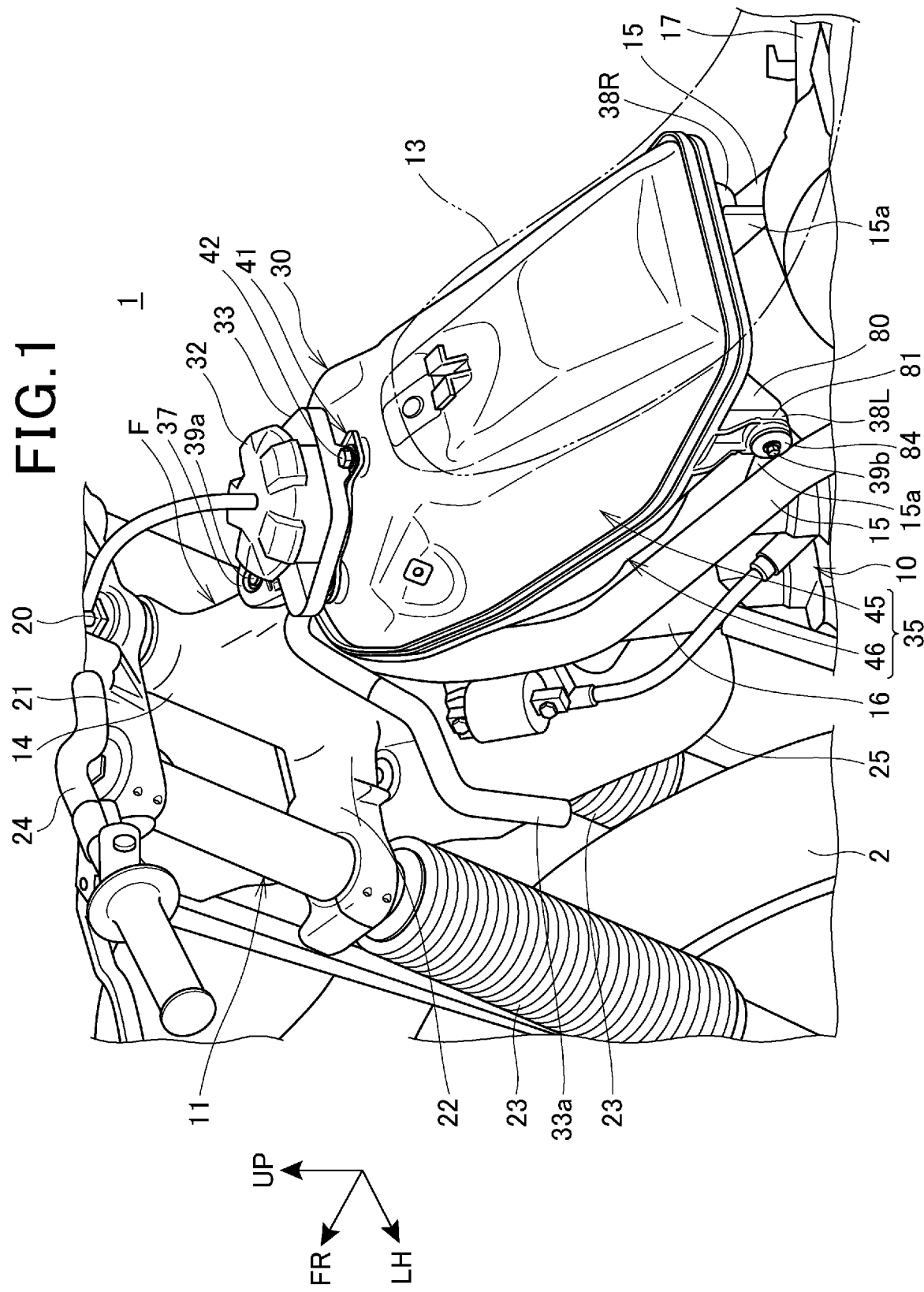
FIG. 1 is a perspective view of a front portion of a motorcycle according to a first embodiment of the present invention as viewed from a left rear side.

FIG. 1 is a perspective view of a front portion of a motorcycle according to a first embodiment of the present invention as viewed from a left rear side.

A motorcycle 1 is a vehicle where an engine 10 which forms a power unit is supported on a vehicle body frame F, a steering system 11 which supports a front wheel 2 in a steerable manner is supported on a front end of the vehicle body frame F in a steerable manner, and a swing arm (not shown in the drawing) which supports a rear wheel (not shown in the drawing) is provided on a rear portion side of the vehicle body frame F. The motorcycle 1 is a saddle riding vehicle where a seat 13 on which a rider seats in a straddling manner is disposed above a rear portion of the vehicle body frame F.

The vehicle body frame F includes a head pipe portion 14, a pair of left and right main frames 15, 15, a down frame 16, a pair of left and right pivot frames (not shown in the drawing), a pair of left and right seat frames 17, 17 (the left seat frame not shown in the drawing), and a pair of left and right sub frames (not shown in the drawing).

The head pipe portion 14 is provided on a front end of the vehicle body frame F.

The main frames 15, 15 extend rearward in a rearward and downward direction from the head pipe portion 14.

The down frame 16 extends downward from the head pipe portion 14 at a position below the main frames 15, 15, and extends rearward after being bent behind the front wheel 2.

The above-mentioned pivot frames extend downward from rear end portions of the main frames 15, 15, and are connected to a rear end of the down frame 16.

The seat frames 17, 17 extend rearward from rear end portions of the main frames 15, 15.

The above-mentioned sub frames extend rearward and upward from the pivot frames, and are connected to rear ends of the seat frames 17, 17.

The steering system 11 includes a steering shaft 20 which is pivotally supported on the head pipe portion 14, a top bridge 21 which is fixed to an upper end of the steering shaft 20, a bottom bridge 22 which is fixed to a lower end of the steering shaft 20, a pair of left and right front forks 23, 23 which is supported on the top bridge 21 and the bottom bridge 22, and a steering handle 24 which is fixed to the top bridge 21.

The front wheel 2 is pivotally supported on lower end portions of the front forks 23, 23. A front fender 25 is supported on the bottom bridge 22.

The engine 10 is positioned below the main frames 15, 15, and is disposed between the down frame 16 and the above-mentioned pivot frames in the longitudinal direction of the vehicle.

The seat 13 is disposed above the seat frames 17, 17, and is supported on the seat frames 17, 17.

The fuel tank 30 (resin-made tank) is disposed above the main frames 15, 15 along the main frames 15, 15, and is supported on the main frames 15, 15. The fuel tank 30 is disposed between the head pipe portion 14 and the seat 13 in the longitudinal direction of the vehicle. A front end portion of the seat 13 covers an upper surface of a rear portion of the fuel tank 30 from above.

Figure 2:
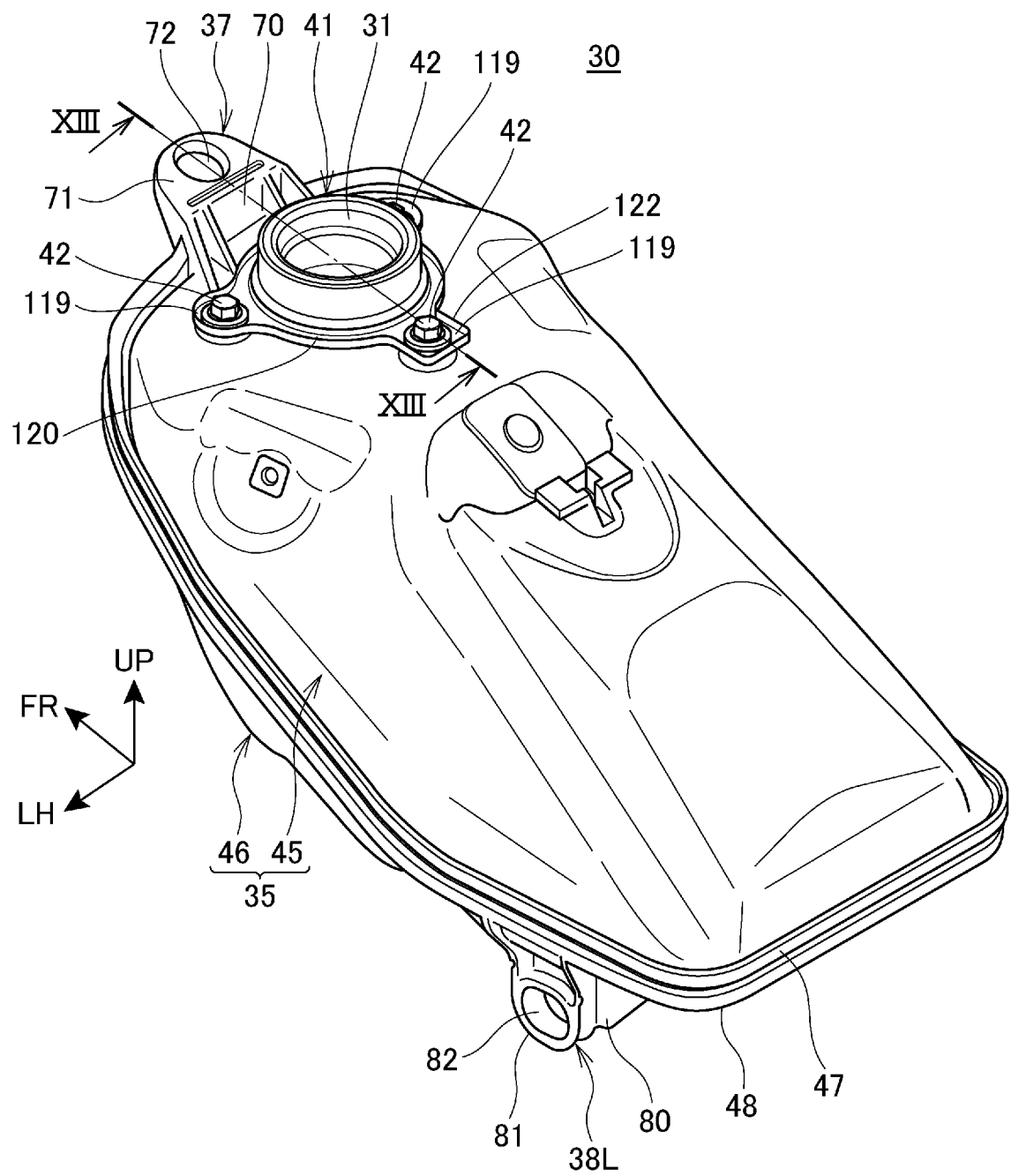
FIG. 2 is a perspective view of a fuel tank as viewed from a left upper side.

FIG. 2 is a perspective view of the fuel tank 30 as viewed from a left upper side.

As shown in FIG. 1 and FIG. 2, a filler opening 31 is provided on an upper surface of a front portion of the fuel tank 30. A tank cap 32 is mounted on the filler opening 31, and the filler opening 31 is closed by the tank cap 32.

A tray 33 which surrounds the filler opening 31 from the periphery of the filler opening 31 is mounted on the fuel tank 30. The tray 33 is disposed between a lower end of the tank cap 32 and the upper surface of the fuel tank 30.

A drain pipe 33a extending downward is provided on the tray 33. Fuel leaked at the time of filling fuel or the like is received by the tray 33, and is discharged downward through the drain pipe 33a.

Figure 3:
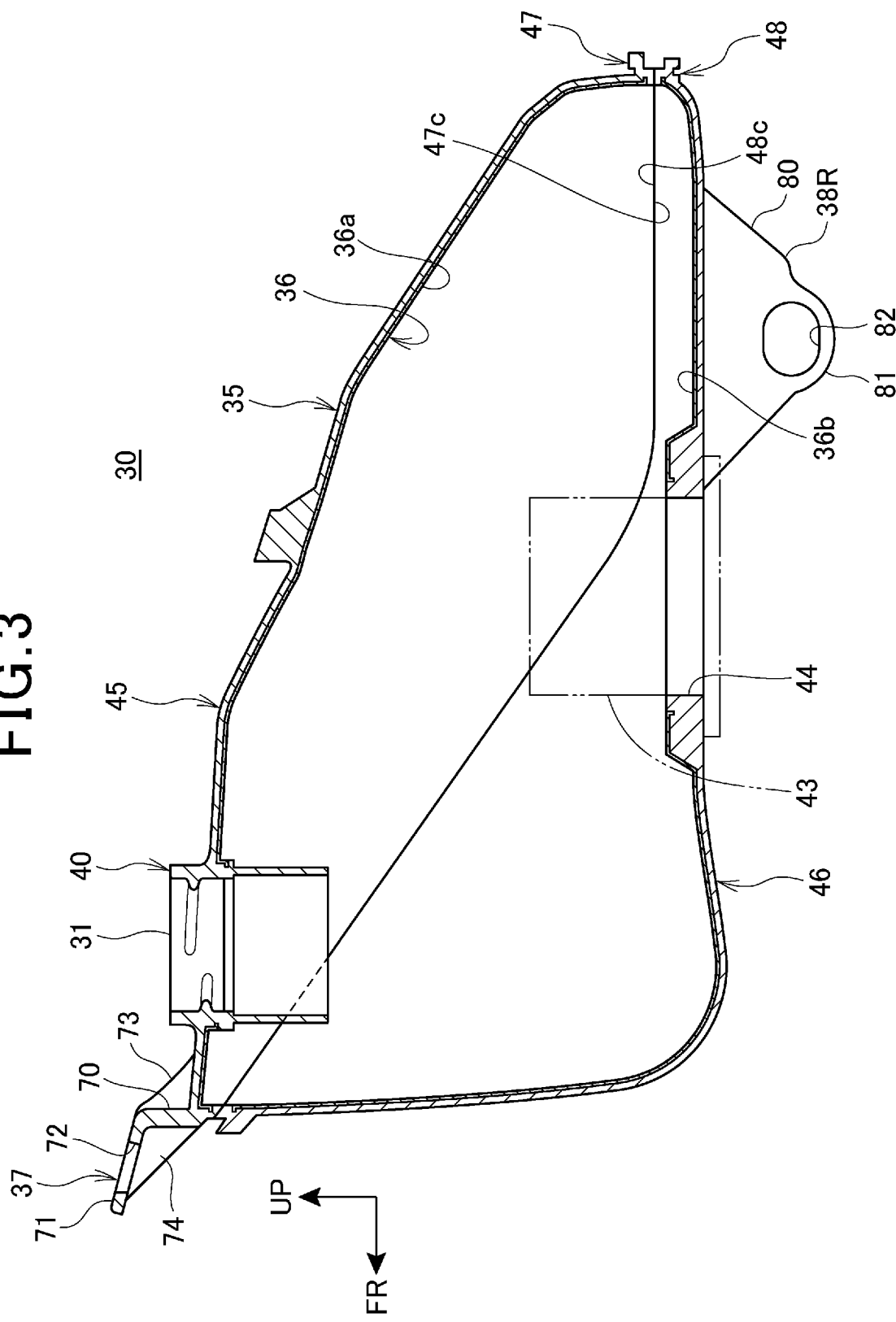
FIG. 3 is a cross-sectional view of the fuel tank by cutting the fuel tank at the center of the fuel tank in a vehicle width direction.
Figure 4:
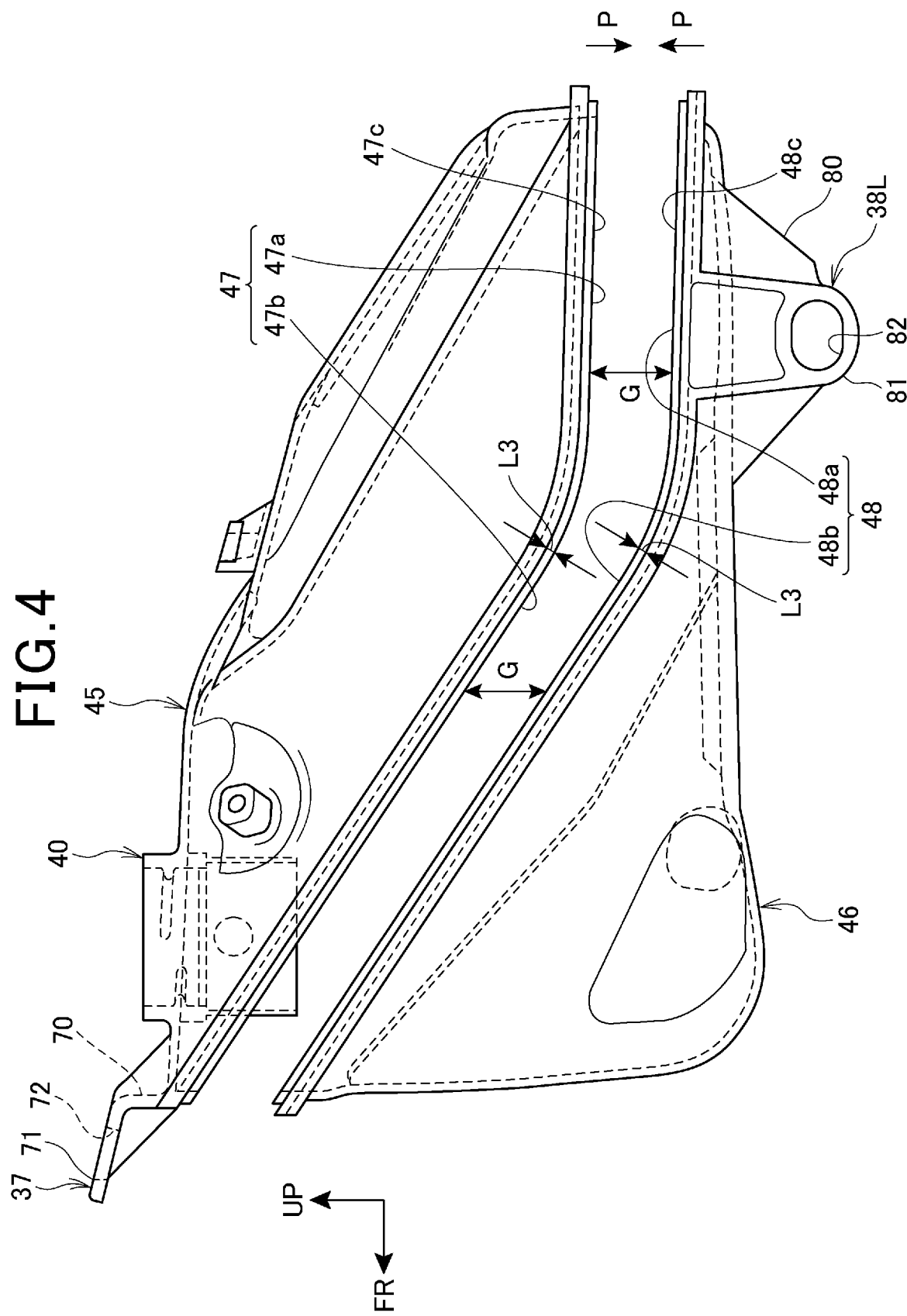
FIG. 4 is a left side view showing a state where the fuel tank is split in two.

FIG. 3 is a cross-sectional view of the fuel tank 30 obtained by cutting the fuel tank 30 at the center of the fuel tank 30 in the vehicle width direction. FIG. 4 is a left side view showing a state where the fuel tank 30 is split in two.

With reference to FIG. 2 to FIG. 4, the fuel tank 30 includes a resin-made fuel tank body 35 (tank body), and a barrier sheet layer 36 which is provided on approximately the whole inner surface of the fuel tank body 35.

The barrier sheet layer 36 is made of a material having lower fuel permeability than a material for forming the fuel tank body 35. Due to the provision of the barrier sheet layer 36, it is possible to prevent leakage of fuel such as gasoline stored in the fuel tank 30 to the outside through the fuel tank 30.

A front mounting stay 37 (mounting stay) which projects frontward is provided on an upper portion of a front portion of the fuel tank body 35.

The front portion of the fuel tank body 35 is fixed to an upper surface of a rear portion of the head pipe portion 14 by a tank fixing jig 39a (fixing jig, see FIG. 1) which passes through the front mounting stay 37 from above.

A pair of left and right rear mounting stays 38L, 38R (mounting stays) which projects downward is provided on a lower portion of a rear portion of the fuel tank body 35.

The main frames 15, 15 include tank stays 15a, 15a (FIG. 1) which extend upward on rear portions thereof respectively.

A rear portion of the fuel tank body 35 is fixed to the tank stays 15a, 15a by tank fixing jigs 39b, 39b (fixing jigs, see FIG. 1) which pass through the rear mounting stays 38L, 38R respectively from the outside in the vehicle width direction.

The fuel tank body 35 includes a cylindrical filling portion 40 for filling fuel (for filling liquid) on the upper portion of the front portion thereof. The cylindrical filling portion 40 is a cylinder extending in the vertical direction, and an upper end portion of the cylindrical filling portion 40 forms the filler opening 31.

The cylindrical filling portion 40 is made of the same resin material as a resin material for forming the fuel tank body 35, and is formed integrally with the fuel tank body 35.

As shown in FIG. 2, a metal-made mouthpiece 41 (not shown in the drawings in FIG. 3 and FIG. 4) is mounted on the cylindrical filling portion 40. The mouthpiece 41 is fixed to the upper surface of the fuel tank body 35 by a plurality of mouthpiece fixing jigs 42 (fixing jigs) which are made to pass through the mouthpiece 41 from above.

The fuel tank body 35 includes a pump mounting opening portion 44 on which the fuel pump 43 is mounted on a lower surface of the fuel tank body 35.

The fuel tank body 35 has the two-split structure where the fuel tank body 35 is split into an upper half body 45 (split body, one split body) which forms an upper portion of the fuel tank body 35, and a lower half body 46 (split body, the other split body) which forms a lower portion of the fuel tank body 35. The fuel tank body 35 is formed into a tank shape by bonding the upper half body 45 and the lower half body 46 to each other.

The upper half body 45 is formed into a case shape having a lower surface thereof opened downward. A peripheral portion of an opening on a lower surface of the upper half body 45 forms an upper bonding portion 47 (flange portion) to be bonded to the lower half body 46. As viewed in a side view of a vehicle, the upper bonding portion 47 has a planar surface portion 47a extending approximately horizontally on a rear portion of the upper bonding portion 47, and an inclined surface portion 47b which extends frontward in an inclined manner in a frontward and upward direction with respect to the planar surface portion 47a.

The front mounting stay 37 is provided on a front end portion of the upper half body 45. The cylindrical filling portion 40 is provided on an upper surface of a front portion of the upper half body 45.

The lower half body 46 is formed into a case shape having an upper surface thereof opened upward. A peripheral portion of an opening on an upper surface of the lower half body 46 forms a lower bonding portion 48 (flange portion) to be bonded to the upper half body 45. As viewed in a side view of the vehicle, the lower bonding portion 48 has a planar surface portion 48a which is parallel to the planar surface portion 47a, and an inclined surface portion 48b which is parallel to the inclined surface portion 47b. The planar surface portion 47a is bonded to the planar surface portion 48a, and the inclined surface portion 47b is bonded to the inclined surface portion 48b.

The rear mounting stays 38L, 38R are provided on a rear portion of the lower half body 46. The pump mounting opening portion 44 is provided on a lower surface of the lower half body 46.

To be more specific, the upper half body 45 and the lower half body 46 are formed into an integral body by being welded to each other at a portion where an upper bonding surface 47c (bonding surface) which is formed of a lower surface of the upper bonding portion 47 of the upper half body 45 and a lower bonding surface 48c (bonding surface) which is formed of an upper surface of the lower bonding portion 48 of the lower half body 46 are mated to each other.

The barrier sheet layer 36 includes: an upper barrier sheet layer 36a (one barrier sheet layer) which is bonded to an inner surface of the upper half body 45; and a lower barrier sheet layer 36b (the other barrier sheet layer) which is bonded to an inner surface of the lower half body 46.

FIG. 5 is a schematic view showing manufacturing steps of the fuel tank body 35.

With reference to FIG. 5, a plurality of materials for forming the barrier sheet layer 36 are supplied to a press-molding die 51, and a sheet-like molded body 50 is extruded from the die 51.

The molded body 50 is formed into a shape which conforms to an inner surface of the fuel tank body 35 by a vacuum molding machine 52. A peripheral portion of the formed barrier sheet layer 36 is trimmed by a trimming die (not shown in the drawing).

The trimmed barrier sheet layer 36 is set in the inside of a die 53 for injection molding provided for forming the fuel tank body 35, and the barrier sheet layer 36 is integrally formed with the fuel tank body 35 at the time of forming the fuel tank body 35 by injection molding. That is, the barrier sheet layer 36 is bonded to the inner surface of the fuel tank body 35 by insert molding.

The upper barrier sheet layer 36a and the lower barrier sheet layer 36b are molded separately.

The upper barrier sheet layer 36a is bonded to the upper half body 45 at the time forming the upper half body 45 by injection molding, and the lower barrier sheet layer 36b is bonded to the lower half body 46 at the time of forming the lower half body 46 by injection molding.

Then, the upper bonding surface 47c and the lower bonding surface 48c are welded by heating, and the upper bonding surface 47c and the lower bonding surface 48c are adhered to each other by pressure bonding and hence, the upper half body 45 and the lower half body 46 are integrally formed with each other.

Figure 6:
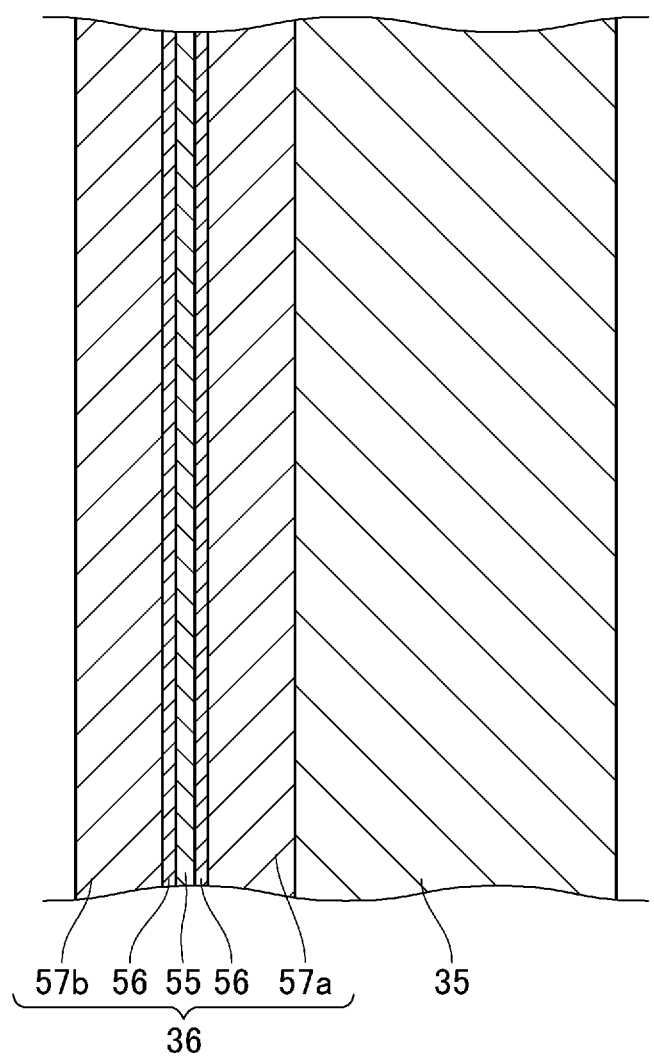
FIG. 6 is a cross-sectional view showing the configuration of the fuel tank in a plate thickness direction.

FIG. 6 is a cross-sectional view showing the configuration of the fuel tank 30 in a plate thickness direction.

The fuel tank 30 is formed of six layers in total. That is, the fuel tank body 35 is formed of one layer, and the barrier sheet layer 36 is formed of five layers.

The barrier sheet layer 36 includes a barrier layer 55, adhesive layers 56, 56 provided on both surfaces of the barrier layer 55, and outer layers 57a, 57b adhered to both sides of the barrier layer 55 with the adhesive layers 56, 56 interposed therebetween.

As one example of a material for forming the fuel tank body 35, high-density polyethylene (HDPE) can be named.

The barrier layer 55 is made of a material which minimally allows permeation of fuel compared to high density polyethylene. As one example, the barrier layer 55 is made of ethylene vinyl alcohol copolymer (EVOH).

The outer layers 57a, 57a are made of the same material as the fuel tank body 35, and are made of high density polyethylene as one example.

The barrier sheet layer 36 is bonded to the inner surface of the fuel tank body 35 with the outer layer 57 on a fuel tank body 35 side interposed therebetween. The barrier sheet layer 36 is bonded to the inner surface of the fuel tank body 35 with the outer layer 57a made of the same material as the fuel tank body 35 interposed therebetween and hence, the barrier sheet layer 36 is strongly bonded to the fuel tank body 35 with high adhesiveness to the fuel tank body 35.

With respect to the barrier sheet layer 36, the outer layer 57b is exposed to the inside of the fuel tank body 35 and is brought into contact with fuel. Accordingly, it is possible to prevent direct contact of fuel with the barrier layer 55.

Figure 7:
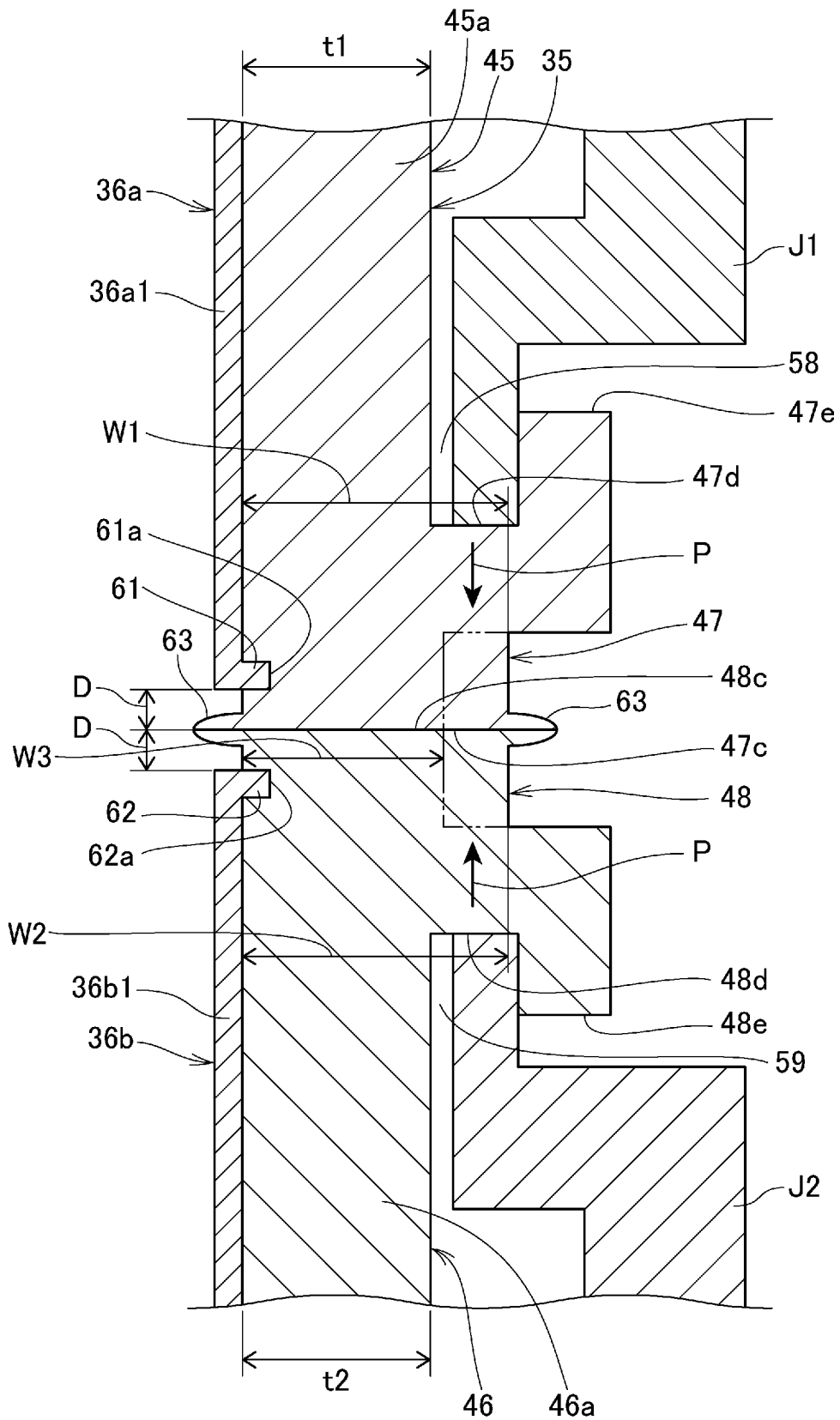
FIG. 7 is a cross-sectional view of a portion where an upper half body and a lower half body are bonded to each other at a planar portion.

FIG. 7 is a cross-sectional view of the portion where the upper half body 45 and the lower half body 46 are bonded to each other at the planar surface portions 47a, 48a.

The upper bonding portion 47 is formed in a flange shape protruding from an outer surface of the upper half body 45 toward the outside of the fuel tank body 35. The upper bonding portion 47 is provided over the whole circumference of the upper half body 45.

A width W1 of the upper bonding portion 47 is larger than a thickness t1 of a side wall portion 45a (wall portion) of the upper half body 45.

A pressing surface 47d which is disposed parallel to the upper bonding surface 47c is formed on an upper surface of a distal end portion of the flange-shaped upper bonding portion 47.

The upper half body 45 includes a peripheral rib 47e extending upward from an upper portion of the distal end surface of the upper bonding portion 47. The peripheral rib 47e is provided over the substantially whole circumference of the upper half body 45.

The pressing surface 47d is a bottom surface of a groove portion 58 which is formed between the peripheral rib 47e and the outer surface of the upper half body 45.

The upper half body 45 is pressed to the lower bonding surface 48c of the lower half body 46 by a pressing jig J1 which is engaged with the groove portion 58 and presses the pressing surface 47d.

The pressing surface 47d overlaps with the upper bonding surface 47c in a pressing direction P of the pressing jig J1. Accordingly, it is possible to directly press the upper bonding surface 47c by the pressing jig J1 thus favorably performing pressure bonding.

The lower bonding portion 48 is formed in a flange shape protruding from an outer surface of the lower half body 46 toward the outside of the fuel tank body 35. The lower bonding portion 48 is provided over the whole circumference of the lower half body 46.

A width W2 of the lower bonding portion 48 is larger than a thickness t2 of a side wall portion 46a (wall portion) of the lower half body 46.

A pressing surface 48d which is disposed parallel to the lower bonding surface 48c is formed on a lower surface of a distal end portion of the flange-shaped lower bonding portion 48.

The lower half body 46 includes a peripheral rib 48e which extends downward from a lower portion of the distal end surface of the lower bonding portion 48. The peripheral rib 48e is provided over the substantially whole circumference of the lower half body 46.

The pressing surface 48d is a bottom surface of a groove portion 59 which is formed between the peripheral rib 48e and the outer surface of the lower half body 46.

The lower half body 46 is pressed to the upper bonding surface 47c of the upper half body 45 by a pressing jig J2 which is engaged with the groove portion 59 and presses the pressing surface 48d.

The pressing surface 48d overlaps with the lower bonding surface 48c in a pressing direction P of the pressing jig J2. Accordingly, it is possible to directly press the lower bonding surface 48c by the pressing jig J2 thus favorably performing pressure bonding.

The pressing direction P is a direction along which the upper half body 45 and the lower half body 46 are bonded to each other.

An edge of the upper barrier sheet layer 36a is disposed in the vicinity of the upper bonding surface 47c, and a bent portion 61 which bends toward the outside of the fuel tank body 35 is formed on the edge.

The bent portion 61 bends at an approximately right angle with respect to a body portion 36a1 of the upper barrier sheet layer 36a disposed along the inner surface of the upper half body 45.

To be more specific, the bent portion 61 is embedded in the inner surface of the upper half body 45 at a position away from the upper bonding surface 47c upwardly by a distance D. The bent portion 61 extends to the outside of the fuel tank body 35 so as to be parallel to the upper bonding surface 47c.

The bent portion 61 is disposed between the pressing surface 47d and the upper bonding surface 47c in the pressing direction P. A length of the bent portion 61 is smaller than the thickness t1 of the side wall portion 45a.

An edge of the lower barrier sheet layer 36b is disposed in the vicinity of the lower bonding surface 48c, and a bent portion 62 which bends toward the outside of the fuel tank body 35 is formed on the edge.

The bent portion 62 bends at an approximately right angle with respect to a body portion 36b1 of the lower barrier sheet layer 36b disposed along the inner surface of the lower half body 46.

To be more specific, the bent portion 62 is embedded in the inner surface of the lower half body 46 at a position away from the lower bonding surface 48c upwardly by a distance D. The bent portion 62 extends to the outside of the fuel tank body 35 so as to be parallel to the lower bonding surface 48c.

The bent portion 62 is disposed between the pressing surface 48d and the lower bonding surface 48c in the pressing direction P. A length of the bent portion 62 is smaller than the thickness t2 of the side wall portion 46a.

The bent portions 61, 62 are formed by trimming bent portions of peripheral portions of the molded bodies 50 which are formed at the time of molding by the vacuum molding machine 52 (FIG. 5) using cutting blades of the trimming-use dies. Cut surfaces 61a, 62a trimmed in the thickness direction of the bent portions 61, 62 are formed on distal ends of the bent portions 61, 62 by the above-mentioned cutting blades. Accordingly, the bent portions 61, 62 can be easily formed and, at the same time, the bent portions 61, 62 can be formed with high accuracy.

The bent portions 61, 62 are embedded in the upper half body 45 and the lower half body 46 respectively at the time of molding the upper half body 45 and the lower half body 46 by a die 53 (FIG. 5) for injection molding. Accordingly, the bent portions 61, 62 can be easily embedded.

FIG. 8 is a cross-sectional view showing a state before bonding in FIG. 7.

As shown in FIG. 8, in a state before bonding, the upper bonding portion 47 is formed to have a large thickness in the pressing direction P by an amount corresponding to a pressure bonding margin L1 and a melting margin L2.

In the same manner, in a state before bonding, the lower bonding portion 48 is formed to have a large thickness in the pressing direction P by an amount corresponding to a pressure bonding margin L1 and a melting margin L2.

The melting margins L2 are portions to be melted at the time of heating the upper bonding portion 47 and the lower bonding portion 48 to the portions of the pressure bonding margins L1, and do not remain in a completed product of the fuel tank body 35.

The pressure bonding margins L1 are portions to be pressure bonded at the time of welding, and portions of the pressure bonding margins L1 form protruding portions 63, 63 which protrude from the upper bonding surface 47c and the lower bonding surface 48c respectively by pressure (FIG. 7).

The bent portions 61, 62 of the barrier sheet layer 36 are spaced apart from the outer protruding portion 63 in the upward direction and in the downward direction respectively.

In the first embodiment, the bent portions 61, 62 of the barrier sheet layer 36 are spaced apart from the upper bonding surface 47c and the lower bonding surface 48c in the upward direction and in the downward direction respectively, and are not welded to the upper bonding surface 47c and the lower bonding surface 48c respectively. With such a configuration, it is unnecessary to control welding of the upper barrier sheet layer 36a and the lower barrier sheet layer 36b at the time of welding the upper bonding surface 47c and the lower bonding surface 48c to each other and hence, the upper half body 45 and the lower half body 46 can be easily welded to each other.

Further, there is a region where the barrier sheet layer 36 does not exist between the bent portion 61 and the bent portion 62. However, such a region is small and hence, the permeation of fuel to the outside through the region is permissible.

As shown in FIG. 8, the upper bonding portion 47 and the lower bonding portion 48 respectively have a protruding margin extending from an end of the peripheral rib 47e, 48e to a distal end of the melting margin L2 in the pressing direction P. A length of the protruding margin is a protruding size L3. The protruding size L3 is a length in a direction perpendicular to the upper bonding surface 47c and the lower bonding surface 48c. The protruding size L3 may be a length from the pressing surface 47d, 48d to a distal end of the melting margin L2, for example.

As shown in FIG. 4, when the upper half body 45 and the lower half body 46 are moved in the pressing direction P along with welding, in a state where the planar surface portion 47a of the upper bonding portion 47 and the planar surface portion 48a of the lower bonding portion 48 are disposed parallel to each other, a size of a gap G between the upper bonding surface 47c and the lower bonding surface 48c is uniform at any places. That is, the gap G between the planar surface portion 47a and the planar surface portion 48a and the gap G between the inclined surface portion 47b and the inclined surface portion 48b are equal in size. The gap G is a gap in the pressing direction P. Accordingly, it is possible to make a pressing force in the pressing direction P uniformly act on the whole upper bonding portion 47 and the whole lower bonding portion 48.

Further, the protruding size L3 is uniform over the whole circumference of the upper bonding portion 47 and over the whole circumference of the lower bonding surface 48c.

The inclined surface portions 47b, 48b are inclined with respect to the pressing direction P and hence, a pressing force acting on the inclined surface portions 47b, 48b at the time of welding becomes smaller than a pressing force acting on the planar surface portions 47a, 48a.

In this first embodiment, to describe with reference to FIG. 7, the width W3 of the upper bonding portion 47 and the lower bonding portion 48 (portions indicated by an imaginary line in FIG. 7) at the inclined surface portions 47b, 48b (FIG. 4) is smaller than the widths W1, W2 of the upper bonding portion 47 and the lower bonding portion 48 at planar surface portions 47a, 48a.

With such a configuration, an area of the upper bonding surface 47c of the inclined surface portion 47b and an area of the lower bonding surface 48c of the inclined surface portion 48b become small, and a surface pressure applied to the inclined surface portions 47b, 48b due to a pressing force in the pressing direction P become large. Accordingly, a pressure surface acting on the whole upper bonding portion 47 and the whole lower bonding portion 48 can be made uniform thus enabling favorable welding.

Next, the structures of the front mounting stay 37 and the rear mounting stays 38L, 38R are described.

Figure 9:
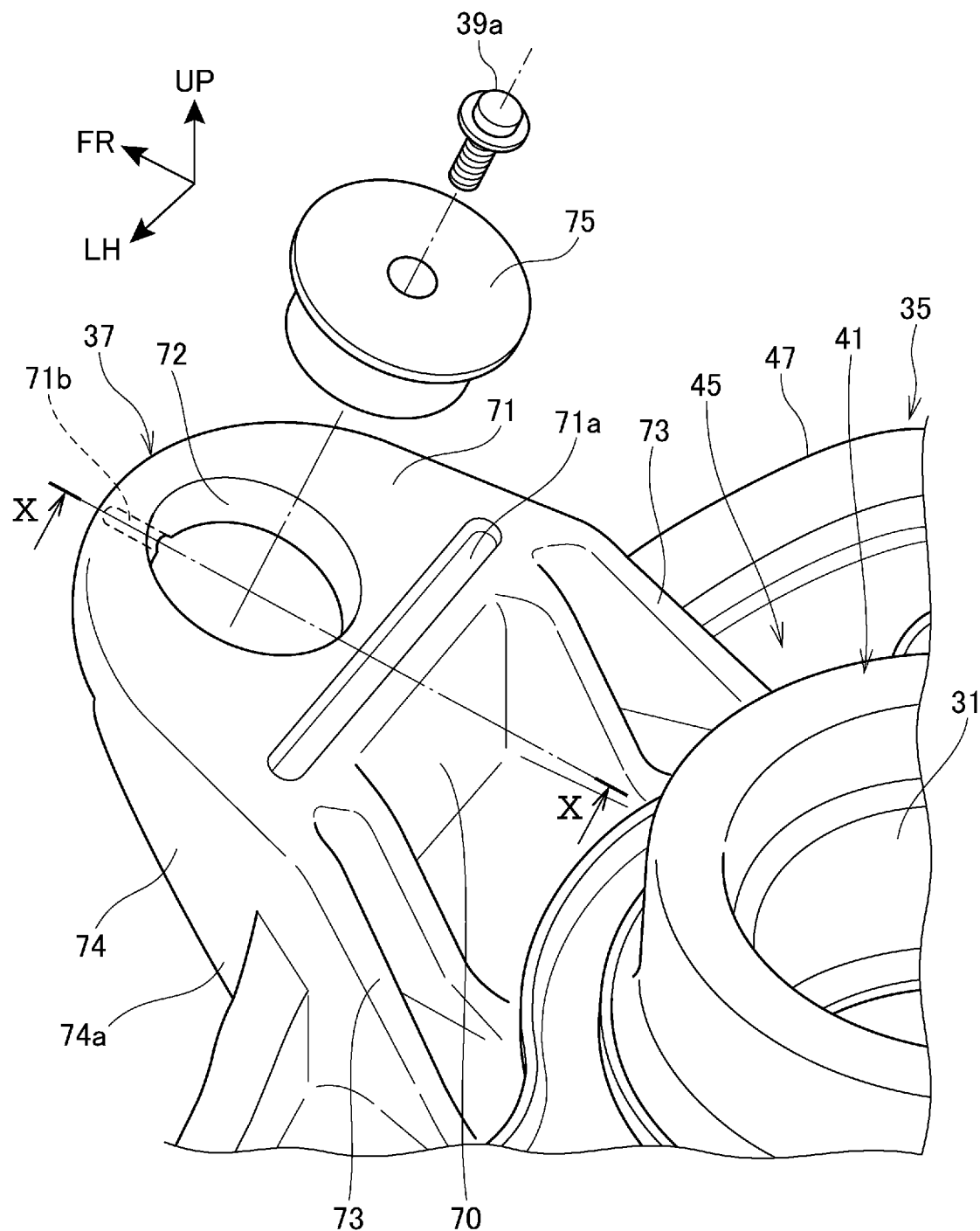
FIG. 9 is a perspective view of a front mounting stay as viewed from a left upper side.
Figure 10:
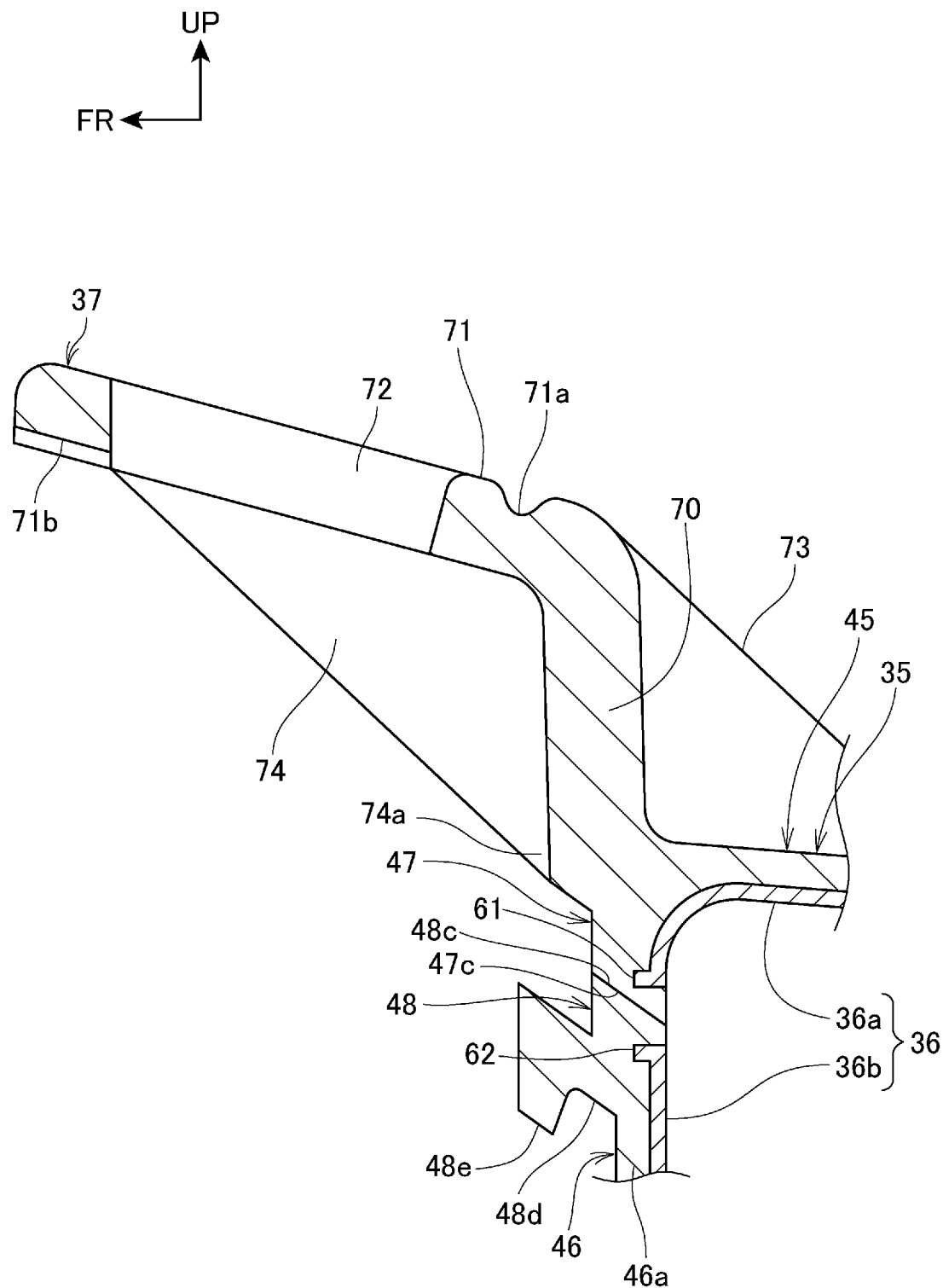
FIG. 10 is a cross-sectional view taken along a line X-X in FIG. 9

FIG. 9 is a perspective view of the front mounting stay 37 as viewed from a left upper side. FIG. 10 is a cross-sectional view taken along a line X-X in FIG. 9.

With reference to FIG. 9 and FIG. 10, the front mounting stay 37 is provided on a center portion of a front end portion of the upper half body 45 in a width direction (vehicle width direction) of the fuel tank body 35, and is positioned in front of the filler opening 31.

The front mounting stay 37 has: a vertical wall portion 70 extending upward from a front edge of an upper surface of the upper half body 45; a plate-like frontwardly extending portion 71 extending frontward from an upper end of the vertical wall portion 70; and a mounting hole 72 which vertically penetrates the frontwardly extending portion 71 in the plate thickness direction.

The vertical wall portion 70 is formed into a plate shape extending upward along the front edge of the upper surface of the upper half body 45. A rear surface of the vertical wall portion 70 is connected to an upper surface of a front end portion of the upper half body 45 by rear surface ribs 73, 73.

The rear surface ribs 73, 73 are provided in pair on left and right side edge portions of the rear surface of the vertical wall surface 70. Rear edges of the rear surface ribs 73, 73 extend rearward and downward toward the filler opening 31.

The frontwardly extending portion 71 extends frontward in a frontward and upward direction. A lower surface of the frontwardly extending portion 71 is connected to a front surface of the vertical wall portion 70 by reinforcing ribs 74, 74 (ribs). The reinforcing ribs 74, 74 extend downward in a left and right pair from left and right side edges of the frontwardly extending portion 71, and rear ends of the reinforcing ribs 74, 74 are connected to left and right side edge portions of a front surface of the vertical wall portion 70. Front edges of the reinforcing ribs 74, 74 are inclined in a rearward and downward direction as viewed in a side view of the vehicle. Lower end portions 74a of the reinforcing ribs 74, 74 are connected to an upper portion of the flange-shaped upper bonding portion 47. The reinforcing ribs 74, 74 extend from the upper bonding portion 47 to a lower surface of the frontwardly extending portion 71.

The mounting hole 72 is a circular hole. The mounting hole 72 is disposed between the left and right reinforcing ribs 74, 74 on the frontwardly extending portion 71.

A cylindrical collar member 75 having anti-vibration property is fitted in the mounting hole 72, and the tank fixing jig 39a passes through a hole of the collar member 75 from above. The tank fixing jig 39a is a bolt.

The tank fixing jig 39a fastens the front mounting stay 37 to the vehicle body frame F (FIG. 1) by way of the collar member 75.

As shown in FIG. 10, the vertical wall portion 70 of the front mounting stay 37 extends upward from the upper surface of the upper half body 45 which is spaced apart upward from the upper bonding surface 47c and the lower bonding surface 48c. That is, the front mounting stay 37 is integrally provided to the upper half body 45 at a position away from the upper bonding surface 47c and the lower bonding surface 48c in the vertical direction.

With such a configuration, an external force which is transmitted to the upper half body 45 by way of the front mounting stay 37 is not concentrated on the upper bonding surface 47c and the lower bonding surface 48c, and is dispersed to the upper surface portion of the upper half body 45. Accordingly, an influence of an external force on the barrier sheet layer 36 in the vicinity of the upper bonding surface 47c and the lower bonding surface 48c can be reduced thus effectively protecting the barrier sheet layer 36.

An upper surface groove 71a extending in the width direction of the fuel tank body 35 is provided on the upper surface of the frontwardly extending portion 71 between the mounting hole 72 and the vertical wall portion 70.

A lower surface groove 71b extending in the longitudinal direction is provided on a lower surface of the frontwardly extending portion 71 between the mounting hole 72 and a front end of the frontwardly extending portion 71.

At a portion where the upper surface groove 71a is provided and at a portion where the lower surface groove 71b is provided, a plate thickness of the frontwardly extending portion 71 becomes small, and strength of the frontwardly extending portion 71 also becomes small. That is, the upper surface groove 71a and the lower surface groove 71b are fragile portions which decrease strength of the frontwardly extending portion 71. Strength of the frontwardly extending portion 71 is decreased at the upper surface groove 71a and the lower surface groove 71b provided around the mounting hole 72.

When an excessive external force acts on the front mounting stay 37, the front mounting stay 37 is broken first at a portion around the upper surface groove 71a or at a portion around the lower surface groove 71b so that a part of the external force is absorbed by the front mounting stay 37. Accordingly, it is possible to prevent an excessive external force from being transmitted to the barrier sheet layer 36 by way of the front mounting stay 37 thus protecting the barrier sheet layer 36.

Figure 11:
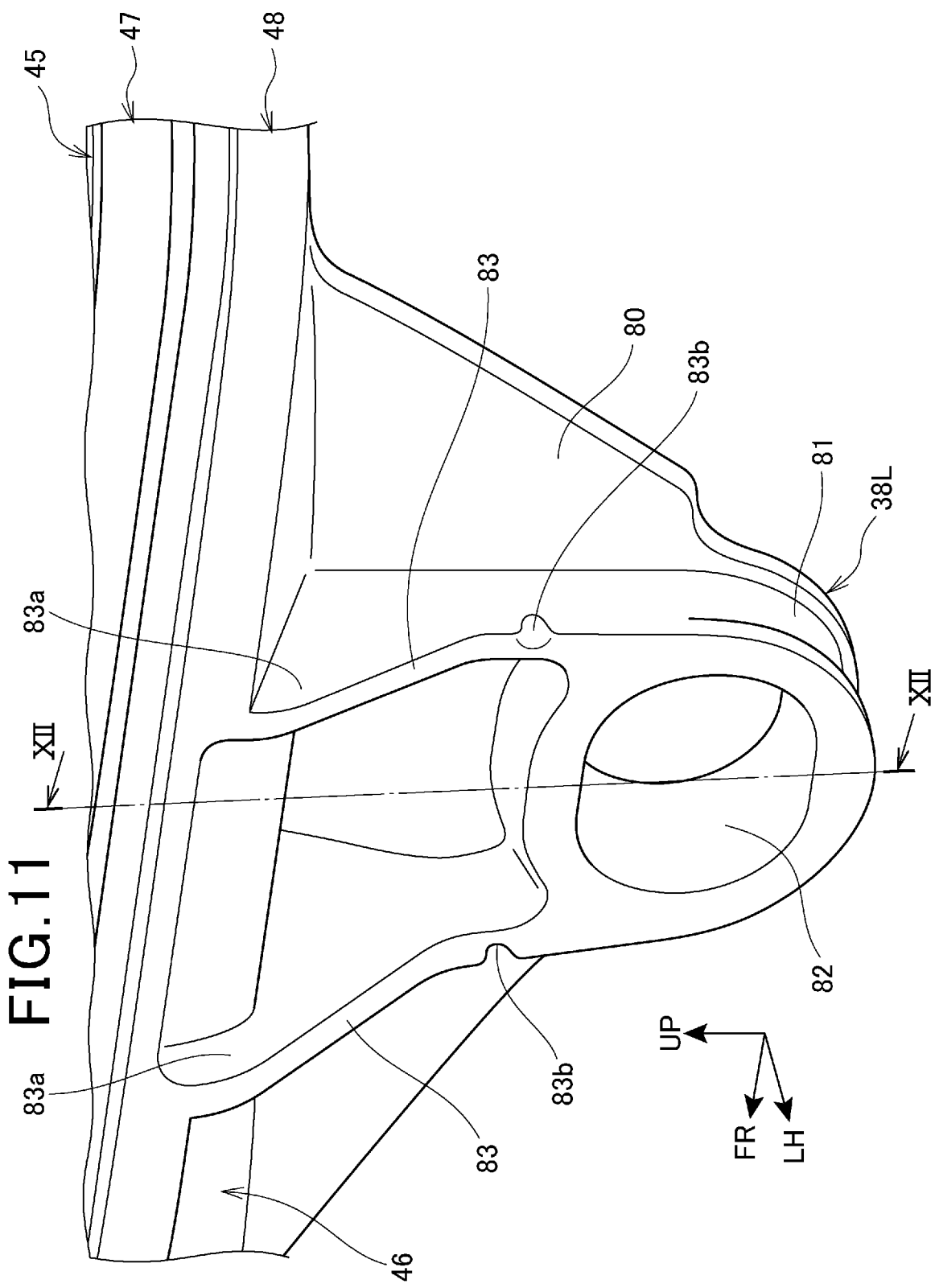
FIG. 11 is a perspective view of a rear mounting stay as viewed from a left rear side.
Figure 12:
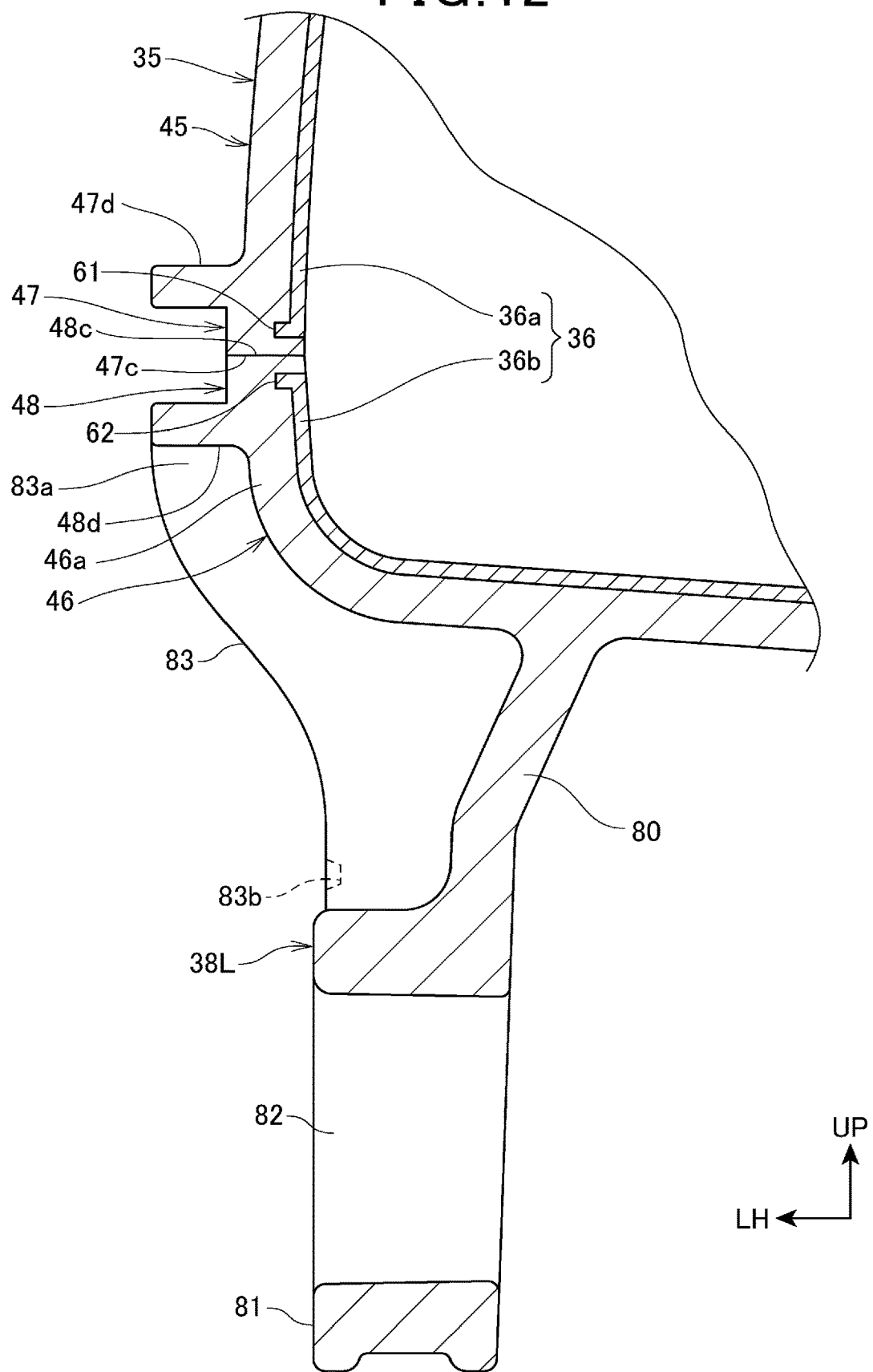
FIG. 12 is a cross-sectional view taken along a line XII-XII in FIG. 11.

FIG. 11 is a perspective view of the rear mounting stay 38L as viewed from a left rear side. FIG. 12 is a cross-sectional view taken along a line XII-XII in FIG. 11. The rear mounting stays 38L, 38R are disposed in left and right symmetry and hence, in this embodiment, the rear mounting stay 38L is described in detail, and the description of the rear mounting stay 38R is simplified.

With reference to FIG. 11 and FIG. 12, the rear mounting stay 38L is mounted on a left edge portion of a rear portion of the lower half body 46. The rear mounting stay 38R is mounted on a right edge portion of a rear portion of the lower half body 46.

The rear mounting stay 38L has: a side wall portion 80 extending downward from a side edge portion of a lower surface of the lower half body 46; and a cylindrical portion 81 integrally provided on a lower end portion of the side wall portion 80.

The side wall portion 80 is formed into a plate shape facing in the vehicle width direction of the motorcycle 1, and is formed into an inverted triangular shape which is tapered downward as viewed in a side view.

The cylindrical portion 81 is formed into a cylindrical shape protruding outward in the vehicle width direction from a lower end portion of the side wall portion 80. The cylindrical portion 81 has a mounting hole 82 which penetrates the rear mounting stay 38L in the vehicle width direction at the center thereof.

A pair of reinforcing ribs 83, 83 (ribs) which connects an upper portion of the cylindrical portion 81 and a lower surface of the lower half body 46 to each other in the vertical direction is provided on an outer surface of the side wall portion 80. The reinforcing ribs 83, 83 are disposed in pair in a spaced apart manner in the longitudinal direction.

Portions of upper end portions 83a of the reinforcing ribs 83, 83 are connected to a lower portion of the flange-shaped lower bonding portion 48. The reinforcing ribs 83, 83 extend from the lower bonding portion 48 to the cylindrical portion 81.

With reference to FIG. 1 and FIG. 11, a cylindrical collar member 84 having anti-vibration property is fitted in the mounting hole 82, and the tank fixing jig 39b passes through a hole of the collar member 84 from the outside in the vehicle width direction. The tank fixing jig 39b is a bolt.

The tank fixing jig 39b fastens the rear mounting stay 38L to the tank stays 15a, 15a by way of the collar member 84.

As shown in FIG. 12, the side wall portion 80 of the rear mounting stay 38L extends downward from a lower surface of the lower half body 46 which is downwardly spaced apart from the upper bonding surface 47c and the lower bonding surface 48c. That is, the rear mounting stay 38L is integrally provided on the lower half body 46 at a position away from the upper bonding surface 47c and the lower bonding surface 48c in the vertical direction.

With such a configuration, an external force which is transmitted to the lower half body 46 by way of the rear mounting stay 38L is not concentrated on the upper bonding surface 47c and the lower bonding surface 48c and is dispersed to the lower surface portion of the lower half body 46. Accordingly, an influence of an external force on the barrier sheet layer 36 in the vicinity of the upper bonding surface 47c and the lower bonding surface 48c can be reduced thus effectively protecting the barrier sheet layer 36.

Grooves 83b, 83b which are indented toward the inside in the vehicle width direction are provided on lower end portions of the reinforcing ribs 83, 83 respectively in the vicinity of the outer periphery of the cylindrical portion 81.

At portions where the grooves 83b, 83b are provided, plate thicknesses of the reinforcing ribs 83, 83 become small so that strength of the rear mounting stay 38L becomes small. That is, the grooves 83b, 83b are fragile portions which decrease strength of the rear mounting stay 38L. The strength of the rear mounting stay 38L becomes small at portions where the grooves 83b, 83b are provided around the mounting hole 82.

When an excessive external force acts on the rear mounting stay 38L, the rear mounting stay 38L is broken first at portions around the grooves 83b, 83b so that a part of the external force is absorbed by the rear mounting stay 38L. Accordingly, it is possible to prevent an excessive external force from being transmitted to the barrier sheet layer 36 by way of the rear mounting stay 38L thus protecting the barrier sheet layer 36.

With reference to FIG. 1 to FIG. 3, the front mounting stay 37 and the rear mounting stays 38L, 38R are arranged in a spaced apart manner in the longitudinal direction and in the vertical direction from each other.

To be more specific, the front mounting stay 37 is provided on the upper portion of the front end portion of the upper half body 45, and the rear mounting stays 38L, 38R are provided on the lower portion of the rear portion of the lower half body 46. That is, the front mounting stay 37 and the rear mounting stays 38L, 38R are arranged in a spaced apart manner in the longitudinal direction and in the vertical direction and, at the same time, are provided on the upper half body 45 and the lower half body 46 in a split manner. With such a configuration, an external force acting on the fuel tank body 35 from the front mounting stay 37 and the rear mounting stays 38L, 38R can be dispersed in a wide region of the fuel tank body 35. Accordingly, it is possible to prevent the concentration of a stress on the barrier sheet layer 36 in the vicinity of the upper bonding surface 47c and the lower bonding surface 48c thus effectively protecting the barrier sheet layer 36.

Next, the mounting structure of the mouthpiece 41 is described.

Figure 13:
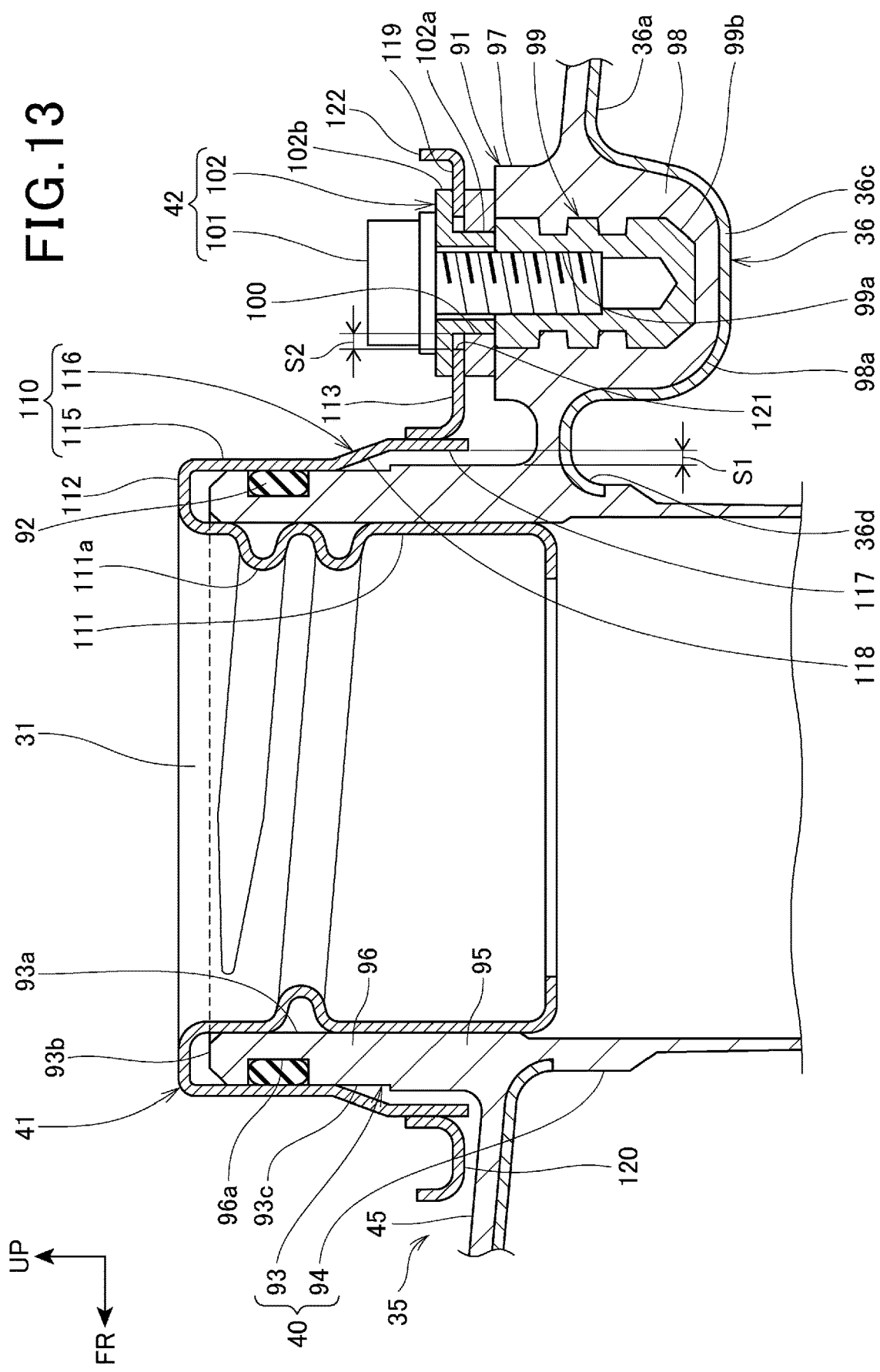
FIG. 13 is a cross-sectional view taken along a line XIII-XIII in FIG. 2.

FIG. 13 is a cross-sectional view taken along a line XIII-XIII in FIG. 2.

As shown in FIG. 13, the mouthpiece 41 is mounted on the cylindrical filling portion 40 by engagement. The mouthpiece 41 is fixed to a mouthpiece fixing portion 91 (fixing portion) provided on the upper surface of the fuel tank body 35 by the mouthpiece fixing jig 42. A seal member 92 is interposed between the mouthpiece 41 and the cylindrical filling portion 40.

The cylindrical filling portion 40 includes: a mouthpiece mounting cylinder portion 93 which extends upward from the upper surface of the upper half body 45; and a tank inner cylinder portion 94 which extends to the inside of the fuel tank body 35 as integral parts thereof.

The cylindrical filling portion 40 is integrally formed with the fuel tank body 35 at the time of forming the fuel tank body 35 by injection molding using the die 53 shown in FIG. 5.

The mouthpiece mounting cylinder portion 93 includes: a proximal end portion 95 which extends upward from the upper surface of the upper half body 45; and an upper portion 96 (a portion covered by a fitting portion) which is positioned above the proximal end portion 95. The proximal end portion 95 and the upper portion 96 are provided concentrically, and an outer diameter of the proximal end portion 95 is set larger than an outer diameter of the upper portion 96.

An annular seal groove 96a which is indented radially inwardly is provided on an outer peripheral portion of the upper portion 96 of the mouthpiece mounting cylinder portion 93.

An inner peripheral surface 93a of the mouthpiece mounting cylinder portion 93 has the same diameter over the whole length of the mouthpiece mounting cylinder portion 93.

A distal end surface 93b of the mouthpiece mounting cylinder portion 93 is flat. A chamfered portion is provided on an inner edge and an outer edge of the distal end surface 93b.

On the outer peripheral surface 93c of the mouthpiece mounting cylinder portion 93, a step is formed on an intermediate portion in the vertical direction due to the difference in outer diameter between the proximal end portion 95 and the upper portion 96.

Figure 14:
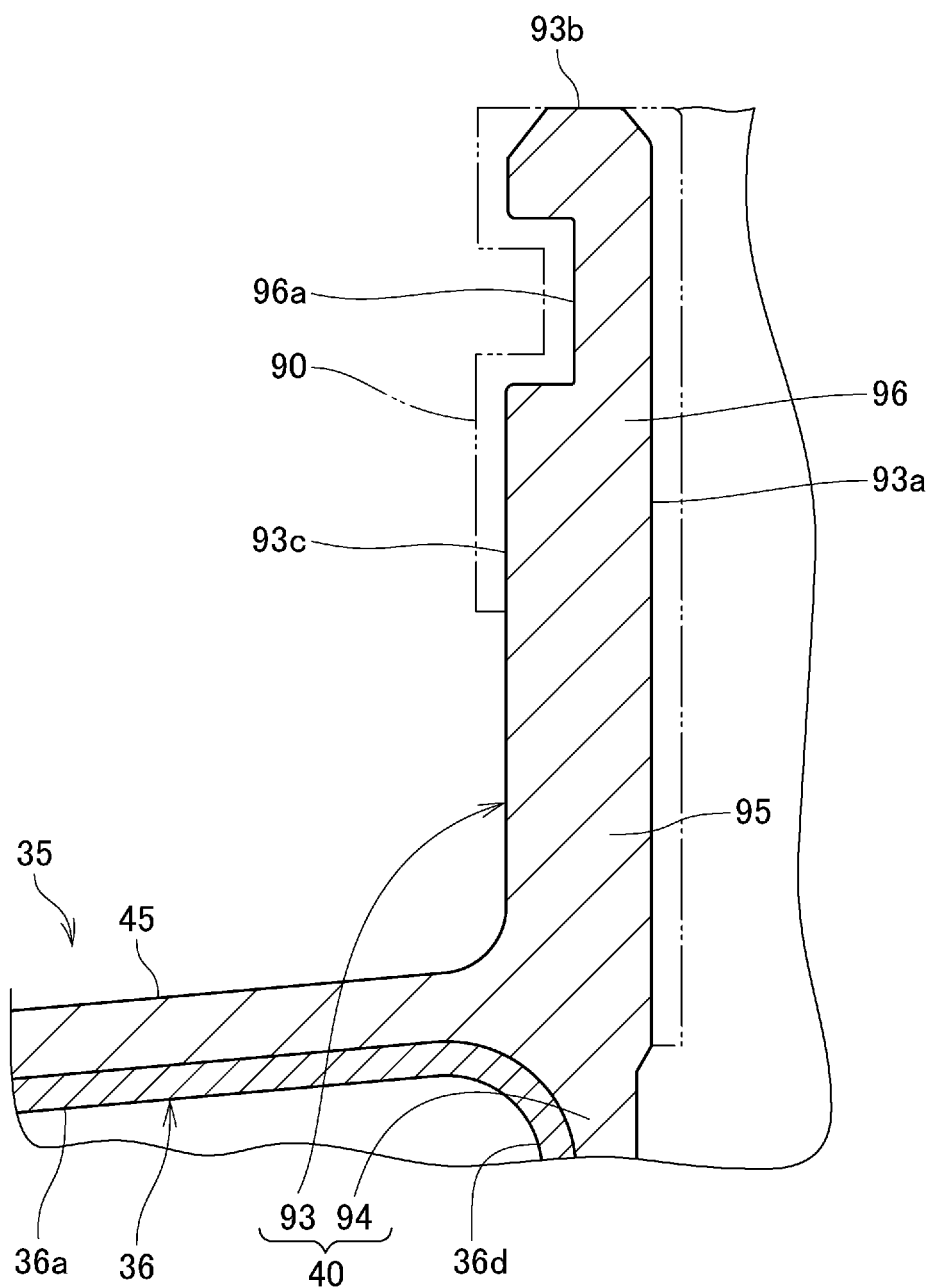
FIG. 14 is a cross-sectional view for explaining machining applied to a mouthpiece mounting cylinder portion.

FIG. 14 is a cross-sectional view for explaining machining applied to the mouthpiece mounting cylinder portion 93.

In the mouthpiece mounting cylinder portion 93, after forming the mouthpiece mounting cylinder portion 93 by injection molding using the die 53 in FIG. 5, a finished portion 90 shown in FIG. 14 is formed with high accuracy by machining. The machining is milling, for example.

To be more specific, the finished portion 90 is formed of: the outer peripheral surface 93c of the upper portion 96 including the seal groove 96a; the distal end surface 93b; and the inner peripheral surface 93a.

The mouthpiece fixing portion 91 includes: an outer protruding portion 97 which protrudes upward from the upper surface of the upper half body 45; and an inner protruding portion 98 (protruding portion) which protrudes toward the inside of the fuel tank body 35. The outer protruding portion 97 and the inner protruding portion 98 are formed by protruding a resin which forms the fuel tank body 35.

The mouthpiece fixing portion 91 has a nut 99 embedded in the outer protruding portion 97 and the inner protruding portion 98.

To be more specific, the mouthpiece fixing portion 91 has a hole portion 100 which is indented downward from a flat upper surface of the outer protruding portion 97, and a nut 99 is embedded in a lower side of the hole portion 100. A threaded portion 99a of the nut 99 is exposed from the hole portion 100 to an upper side. A chamfered portion 99b is provided on an outer peripheral portion of a lower end of the nut 99.

Since the mouthpiece fixing portion 91 has the inner protruding portion 98, a large embedded length of the nut 99 can be ensured and hence, the nut 99 can be strongly connected to the fuel tank body 35.

The distal end surface 98a of the inner protruding portion 98 is formed into a semispherical convex shape, and has a smooth curved shape.

Figure 15:
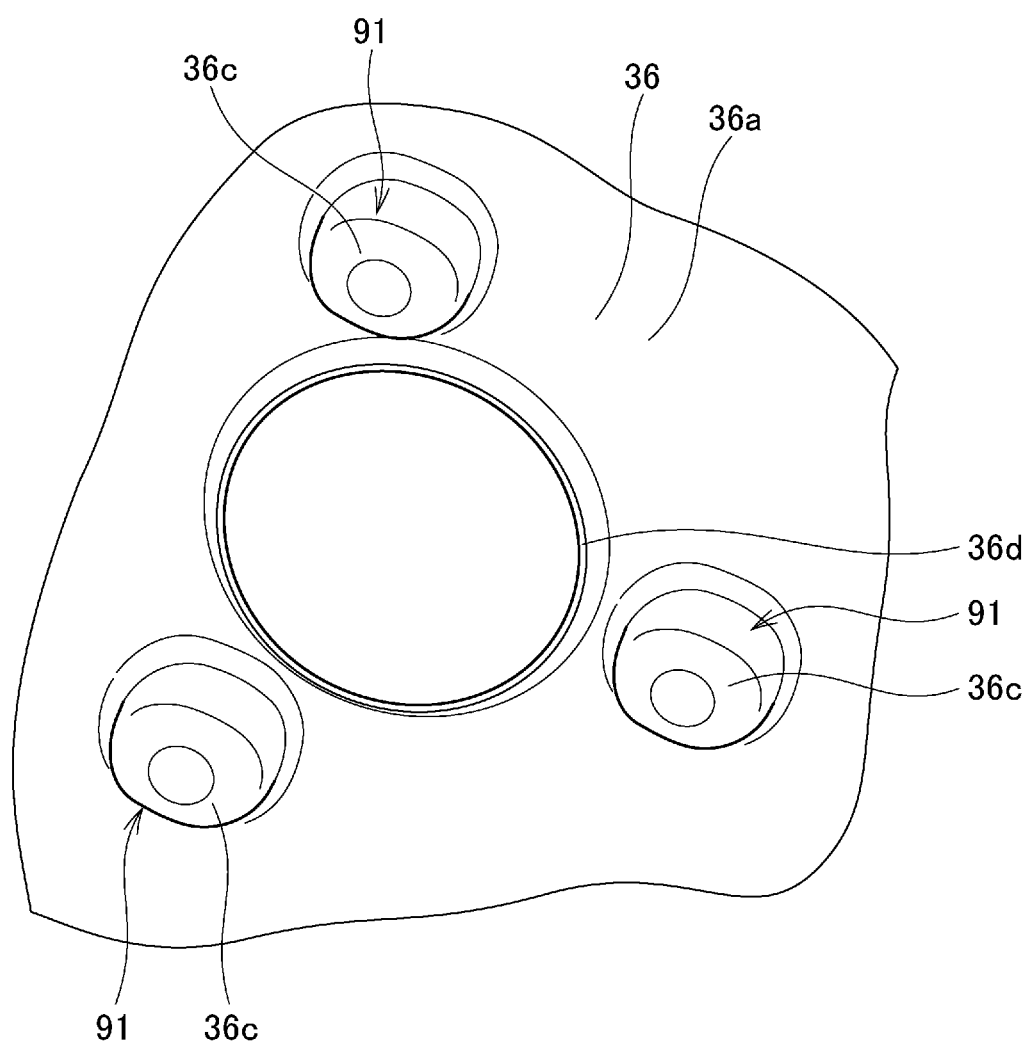
FIG. 15 is a view of an inner protruding portion of a mouthpiece fixing portion and a portion around the inner protruding portion as viewed from the inside of the fuel tank body.

FIG. 15 is a view of the inner protruding portions 98 of the mouthpiece fixing portions 91 and portions around the inner protruding portions 98 as viewed from the inside of the fuel tank body 35.

With reference to FIG. 2, FIG. 13 and FIG. 15, a plurality of the mouthpiece fixing portions 91 are disposed concentrically around the cylindrical filling portion 40 at a substantially equal interval.

The barrier sheet layer 36 is provided also on the inner protruding portions 98. The barrier sheet layer 36 provided on the inner protruding portion 98 forms a curved surface portion 36c having a smoothly curved surface shape along the distal end surface 98a. Accordingly, it is possible to prevent concentration of a stress on the barrier sheet layer 36 provided on the inner protruding portion 98 and hence, the barrier sheet layer 36 can be strongly adhered to the inner surface of the fuel tank body 35.

The barrier sheet layer 36 has a folded portion 36d extending toward the inside of the fuel tank body 35 around the proximal end portion of the tank inner cylinder portion 94. The folded portion 36d is formed into an annular shape along an outer peripheral portion of the proximal end portion of the tank inner cylinder portion 94, and is connected to the outer peripheral portion of the tank inner cylinder portion 94.

The mouthpiece fixing jig 42 includes: a mouthpiece fixing bolt 101 (bolt) which is fastened to the nut 99 of the mouthpiece fixing portion 91; and a collar 102 through which a threaded portion of the mouthpiece fixing bolt 101 passes.

The collar 102 has: a cylinder portion 102a fitted in the hole portion 100 of the mouthpiece fixing portion 91; and a flange portion 102b which protrudes from the cylinder portion 102a.

The mouthpiece 41 includes: a cylindrical skirt portion 110 which covers the outer peripheral surface 93c of the mouthpiece mounting cylinder portion 93; an inner cylinder portion 111 which is fitted in the inner peripheral surface 93a of the mouthpiece mounting cylinder portion 93; an end surface portion 112 which connects an upper edge of the skirt portion 110 and a lower edge of the inner cylinder portion 111 to each other; and a plate-like stay portion 113 which extends from a lower end portion of the skirt portion 110 toward the outside in the radial direction of the mouthpiece 41.

The skirt portion 110, the end surface portion 112 and the inner cylinder portion 111 are integrally provided with each other by bending a metal plate. The stay portion 113 is bonded to the skirt portion 110.

The mouthpiece 41 is made of metal and has a higher strength than the cylindrical filling portion 40. Accordingly, at the time of filling oil in a filling station or the like, the cylindrical filling portion 40 can be protected from a fuel filling nozzle inserted into the filler opening 31.

On an inner peripheral portion of the inner cylinder portion 111, a female threaded portion 111a with which a threaded portion formed on an outer periphery of the tank cap 32 (FIG. 1) is threadedly engaged is provided. The inner cylinder portion 111 is provided over substantially the whole length of the inner peripheral surface 93a of the mouthpiece mounting cylinder portion 93.

The end surface portion 112 extends outward from an upper edge of the inner cylinder portion 111 in the radial direction. The end surface portion 112 is formed into a ring shape coaxially with the cylindrical filling portion 40 as viewed in an axial direction of the mouthpiece 41.

The end surface portion 112 covers the distal end surface 93b of the mouthpiece mounting cylinder portion 93 from above. A gap is provided between the end surface portion 112 and the distal end surface 93b.

The skirt portion 110 bends downward from the outer peripheral portion of the distal end surface 93b, and extends downward parallel to the inner cylinder portion 111.

The skirt portion 110 includes: a fitting portion 115 which is fitted on the upper portion 96 of the outer peripheral surface 93c; and a large diameter portion 116 which covers a portion of the proximal end portion 95 of the outer peripheral surface 93c.

An inner peripheral surface of the fitting portion 115 is brought into close contact with the outer peripheral surface 93c of the upper portion 96. In a seal groove 96a formed on the upper portion 96, a seal member 92 is disposed. The seal member 92 is deformed by being compressed between the seal groove 96a and the fitting portion 115 thus providing sealing between the upper portion 96 and the skirt portion 110.

The large diameter portion 116 of the skirt portion 110 extends downward from the fitting portion 115 to an area in the vicinity of the upper surface of the upper half body 45. The large diameter portion 116 is formed to have the larger outer diameter and the larger inner diameter than those of the fitting portion 115.

The large diameter portion 116 is formed with the diameter larger than the diameter of the fitting portion 115 such that the large diameter portion 116 is spaced apart from the outer peripheral surface 93c of the mouthpiece mounting cylinder portion 93.

To be more specific, the large diameter portion 116 includes: a parallel portion 117 disposed parallel to the fitting portion 115; and an enlarged diameter portion 118 whose diameter is gradually increased from the fitting portion 115 to the parallel portion 117.

The parallel portion 117 is disposed parallel to the proximal end portion 95 of the mouthpiece mounting cylinder portion 93, and covers the proximal end portion 95 from the outside. A gap S1 is formed between the parallel portion 117 and the proximal end portion 95 in a radial direction.

With reference to FIG. 2 and FIG. 13, the stay portion 113 of the mouthpiece 41 includes: a plurality of mounting portions 119 which extend radially outward from the outer peripheral portion of the large diameter portion 116 toward the respective mouthpiece fixing portions 91; and a connecting portion 120 which connects the mounting portions 119, 119 disposed adjacently to each other in the circumferential direction.

In the mounting portion 119, a fixing hole 121 through which the mouthpiece fixing jig 42 passes is provided. To be more specific, the collar 102 of the mouthpiece fixing jig 42 is made to pass through the fixing hole 121.

The fixing hole 121 is formed to have a diameter larger than an outer diameter of the collar 102 so as to allow the movement of the mouthpiece 41 by a predetermined distance with respect to the mouthpiece fixing jig 42. An adjusting gap S2 is formed between the inner periphery of the fixing hole 121 and the outer periphery of the collar 102.

The stay portion 113 has a peripheral rib 122 (rib) which is raised from a periphery of the stay portion 113. The peripheral rib 122 is provided over the whole circumference of the stay portion 113 along the mounting portions 119 and the connecting portion 120.

One example of steps of assembling the mouthpiece 41 to the fuel tank body 35 is described.

As shown in FIG. 13, the mouthpiece 41 is mounted on the mouthpiece mounting cylinder portion 93 by being inserted into the mouthpiece mounting cylinder portion 93 in the axial direction of the mouthpiece mounting cylinder portion 93 such that the mouthpiece mounting cylinder portion 93 is sandwiched between the skirt portion 110 and the inner cylinder portion 111.

The respective mounting portions 119 of the stay portion 113 are brought into contact with the upper surfaces of the respective mouthpiece fixing portions 91 and hence, the mouthpiece 41 is positioned in the axial direction of the mouthpiece mounting cylinder portion 93.

The collar 102 is made to pass through the fixing hole 121 of the stay portion 113 from above, and is set in the hole portion 100 of the mouthpiece fixing portion 91. A lower end of the collar 102 is brought into contact with an upper surface of the nut 99.

When the mouthpiece fixing bolt 101 is fastened to the nut 99, a peripheral portion of the stay portion 113 around the fixing hole 121 is clamped between the flange portion 102b of the collar 102 and the upper surface of the mouthpiece fixing portion 91. With such a configuration, the mouthpiece 41 is fastened to the mouthpiece fixing portions 91 of the fuel tank body 35 by the mouthpiece fixing bolts 101.

In the first embodiment, the mouthpiece 41 is fastened by the mouthpiece fixing bolts 101 in a state where the mouthpiece 41 is inserted into the mouthpiece mounting cylinder portion 93 thus being fixed to the fuel tank body 35. Accordingly, in removing the mouthpiece 41 at the time of maintenance the like, the mouthpiece 41 can be easily removed from the mouthpiece mounting cylinder portion 93 by removing the mouthpiece fixing bolt 101 and by pulling out the mouthpiece 41. The mouthpiece 41 is not swaged to the mouthpiece mounting cylinder portion 93 and hence, the removed mouthpiece 41 can be mounted on the mouthpiece mounting cylinder portion 93 in a recycling manner.

Figure 16:
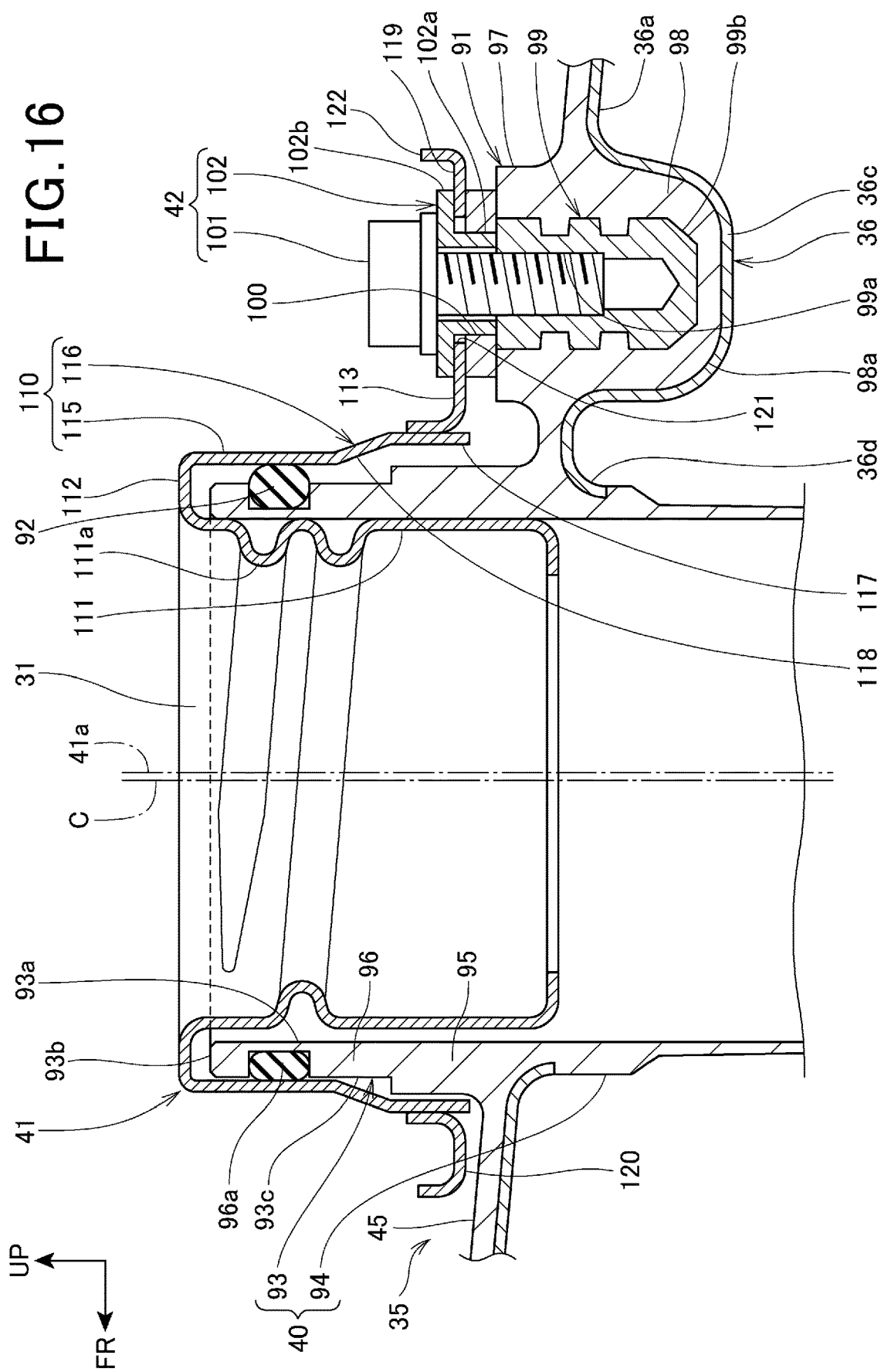
FIG. 16 is a cross-sectional view showing a mounting state of a mouthpiece having an error in size in the mouthpiece mounting cylinder portion.

FIG. 16 is a cross-sectional view showing a mounting state of the mouthpiece 41 when there is an error in size.

In the mouthpiece mounting cylinder portion 93, a dimensional tolerance in manufacture is set. FIG. 16 shows a case where an outer diameter of the upper portion 96 of the mouthpiece mounting cylinder portion 93 is a minimum value of the dimensional tolerance, and an inner diameter of the mouthpiece mounting cylinder portion 93 is a maximum value of the dimensional tolerance as an example.

As shown in FIG. 16, when an actual size of the mouthpiece mounting cylinder portion 93 is deviated from a median of the tolerance, there is a possibility that the mouthpiece 41 is assembled to the mouthpiece mounting cylinder portion 93 in a state where an axis 41a is displaced from an axis C which passes the center of the mouthpiece mounting cylinder portion 93 in a radial direction of the mouthpiece mounting cylinder portion 93.

In this embodiment, the adjusting gap S2 (FIG. 13) is provided between the inner periphery of the fixing hole 121 of the mouthpiece 41 and the outer periphery of the collar 102 of the mouthpiece fixing jigs 42 and, at the same time, the gap S1 (FIG. 13) is provided between the large diameter portion 116 and the proximal end portion 95 in the radial direction. In this embodiment, the adjusting gap S2 and the gap S1 have substantially the same size.

With such a configuration, the mouthpiece 41 can move in the radial direction of the mouthpiece mounting cylinder portion 93 by an amount corresponding to the adjusting gap S2 and an amount of the gap S1, and the mouthpiece 41 can be fixed by the mouthpiece fixing bolt 101 in such a state. Accordingly, the mouthpiece 41 can be mounted on the mouthpiece mounting cylinder portion 93 while allowing the dimensional tolerance in the manufacture of the mouthpiece mounting cylinder portion 93.

In this embodiment, the gap S1 is set such that even when the mouthpiece 41 is moved by making use of the adjusting gap S2, the gap S1 does not become zero. That is, the gap S1 is always formed between the large diameter portion 116 and the cylindrical filling portion 40.

As has been described heretofore, according to the first embodiment to which the present invention is applied, the resin-made fuel tank 30 includes the resin-made fuel tank body 35 provided by bonding the upper half body 45 and the lower half body 46 to each other, and the barrier sheet layer 36 provided on the inner surface of the fuel tank body 35 and provided for reducing permeation of fuel from the fuel tank body 35, the edge of the barrier sheet layer 36 is disposed in the vicinity of the upper bonding surface 47c and the lower bonding surface 48c which are bonded to each other in a state where the upper half body 45 and the lower half body 46 are mated to each other, the edge of the barrier sheet layer 36 has the bent portions 61, 62 which bend toward the outside of the fuel tank body 35, the bent portions 61, 62 are embedded in the fuel tank body 35 at positions away from the upper bonding surface 47c and the lower bonding surface 48c.

With such a configuration, the bent portions 61, 62 which bend toward the outside of the fuel tank body 35 are embedded in the fuel tank body 35 and hence, the edge of the barrier sheet layer 36 is strongly fixed to the fuel tank body 35. Accordingly, the barrier sheet layer 36 is minimally influenced at the time of bonding the upper bonding surface 47c and the lower bonding surface 48c to each other. Further, the bent portions 61, 62 are disposed at positions spaced apart from the upper bonding surface 47c and the lower bonding surface 48c respectively and hence, the bent portions 61, 62 are not bonded to each other at the upper bonding surface 47c and the lower bonding surface 48c. With such a configuration, it is unnecessary to control the bonding of the barrier sheet layer 36 at the time of bonding the upper bonding surface 47c and the lower bonding surface 48c to each other and hence, the resin-made fuel tank 30 can be easily manufactured.

The bent portions 61, 62 of the barrier sheet layer 36 extend toward the outside of the fuel tank body 35 parallel to the upper bonding surface 47c and the lower bonding surface 48c respectively. With such a configuration, surfaces of the bent portions 61, 62 are disposed perpendicular to the bonding direction between the upper bonding surface 47c and the lower bonding surface 48c and hence, the surfaces of the bent portions 61, 62 can efficiently receive a force generated at the time of bonding the upper half body 45 and the lower half body 46 to each other.

Further, the width W1 of the upper bonding portion 47 which has the upper bonding surface 47c at the end surface thereof is larger than the thickness t1 of the side wall portion 45a of the fuel tank body 35, and the width W2 of the lower bonding portion 48 which has the lower bonding surface 48c at the end surface thereof is larger than the thickness t2 of the side wall portion 46a of the fuel tank body 35. With such a configuration, an area of the upper bonding surface 47c and an area of the lower bonding surface 48c can be widely ensured and hence, the bonding strength between the upper bonding surface 47c and the lower bonding surface 48c can be increased.

Further, the upper bonding portion 47 and the lower bonding portion 48 are formed in a flange shape protruding toward the outside of the fuel tank body 35, and the upper bonding portion 47 and the lower bonding portion 48 have the pressing surfaces 47d, 48d to be pressed in applying pressure-bonding to the upper bonding portion 47 and the lower bonding portion 48 respectively, and the pressing surfaces 47d, 48d overlap with the upper bonding surface 47c and the lower bonding surface 48c respectively in the pressing direction P. With such a configuration, at portions where the pressing surfaces 47d, 48d overlap with the upper bonding surface 47c and the lower bonding surface 48c respectively in the pressing direction P, a pressing force of the pressing surfaces 47d, 48d can be directly transmitted to the upper bonding surface 47c and the lower bonding surface 48c respectively. Accordingly, the upper bonding surface 47c and the lower bonding surface 48c can be strongly bonded to each other.

Further, the barrier sheet layer 36 includes the upper barrier sheet layer 36a mounted on the upper half body 45 which forms one split body, and the lower barrier sheet layer 36b which is provided on the lower half body 46 which forms the other split body. The bent portion 61 of the upper barrier sheet layer 36a and the bent portion 62 of the lower barrier sheet layer 36b are embedded on the fuel tank body 35 in a spaced apart manner. With such a configuration, the bent portion 61 and the bent portion 62 are not bonded to each other at the upper bonding surface 47c and the lower bonding surface 48c. Accordingly, it is unnecessary to control the bonding of the barrier sheet layer 36 at the time of bonding the upper bonding surface 47c and the lower bonding surface 48c to each other and hence, the fuel tank 30 can be easily manufactured.

The barrier sheet layer 36 is formed by adhering the outer layers 57a, 57b which are formed of a layer made of high density polyethylene to both surfaces of the barrier layer 55 which is a layer made of ethylene vinyl alcohol copolymer with the adhesive layers 56, 56 interposed therebetween respectively. The barrier sheet layer 36 is bonded to the inner surface of the fuel tank body 35 made of high density polyethylene with the outer layer 57a interposed therebetween. With such a configuration, the barrier sheet layer 36 is formed such that the outer layer 57a which is a layer made of high density polyethylene is bonded to the inner surface of the fuel tank body 35 made of the same material as the outer layer 57a, that is, high density polyethylene. Accordingly, the barrier sheet layer 36 can be strongly bonded to the inner surface of the fuel tank body 35.

Further, cut surfaces 61a, 62a trimmed in the thickness direction are formed on distal ends of the bent portions 61, 62 by a cutting blade. Accordingly, dimensional accuracy of the bent portions 61, 62 can be enhanced so that the bent portions 61, 62 can be properly embedded in the fuel tank body 35.

The upper bonding surface 47c and the lower bonding surface 48c respectively include: the planar surface portion 47a, 48a disposed perpendicular to the pressure bonding direction (pressing direction P) of the upper bonding surface 47c and the lower bonding surface 48c; and the inclined surface portion 47b, 48b inclined with respect to the planar surface portion 47a, 48a. The upper bonding portion 47 having the upper bonding surface 47c on the end surface thereof and the lower bonding portion 48 which has the lower bonding surface 48c at the end surface thereof are formed in a flange shape protruding toward the outside of the fuel tank body 35, and the upper bonding portion 47 and the lower bonding portion 48 respectively include the pressing surface 47d, 48d to be pressed in applying pressure-bonding to the upper bonding surface 47c and the lower bonding surface 48c, and the width W3 of the upper bonding portion 47 and the lower bonding portion 48 at the inclined surface portions 47b, 48b is smaller than the widths W1, W2 of the upper bonding portion 47 and the lower bonding portion 48 at the planar surface portions 47a, 48a.

With such a configuration, at the time of pressure bonding, the inclined surface portions 47b, 48b receive a pressure bonding force smaller than a pressure bonding force which the planar surface portions 47a, 48a perpendicular to the pressure bonding direction (pressing direction P) receive. However, the width W3 of the inclined surface portions 47b, 48b is smaller than the widths W1, W2 of the planar surface portions 47a, 48a and hence, it is possible to acquire a sufficient surface pressure on the inclined surface portions 47b, 48b. Accordingly, the whole upper bonding surface 47c and the whole lower bonding surface 48c can be favorably bonded to each other.

According to the first embodiment to which the present invention is applied, the resin-made fuel tank 30 includes: the resin-made fuel tank body 35 provided by bonding the upper half body 45 and the lower half body 46 to each other; the barrier sheet layer 36 provided on the inner surface of the fuel tank body 35 and provided for reducing permeation of fuel from the fuel tank body 35; and the front mounting stay 37 and the rear mounting stays 38L, 38R provided for mounting the fuel tank body 35 on the vehicle body. The front mounting stay 37 and the rear mounting stays 38L, 38R are provided on the fuel tank body 35 at positions vertically separated from the upper bonding surface 47c and the lower bonding surface 48c which are bonded to each other in a state where the upper half body 45 and the lower half body 46 are mated to each other.

With such a configuration, the front mounting stay 37 and the rear mounting stays 38L, 38R are provided on the fuel tank body 35 at positions vertically away from the upper bonding surface 47c of the upper half body 45 and the lower bonding surface 48c of the lower half body 46 and hence, it is possible to prevent the barrier sheet layer 36 in the vicinity of the upper bonding surface 47c and the lower bonding surface 48c from being influenced by an external force from the front mounting stay 37 and the rear mounting stays 38L, 38R. Accordingly, it is possible to effectively protect the barrier sheet layer 36 against an external force.

The front mounting stay 37 and the rear mounting stay 38L, 38R are spaced apart from each other in the vertical direction and in the longitudinal direction. With such a configuration, an external force which acts on the fuel tank body 35 from the plurality of front mounting stay 37 and rear mounting stays 38L, 38R can be dispersed to a wide region of the fuel tank body 35. Accordingly, it is possible to effectively protect the barrier sheet layer 36 against an external force.

The front mounting stay 37 and the rear mounting stays 38L, 38R are provided to the upper half body 45 and the lower half body 46 in a split manner. With such a configuration, an external force which acts on the fuel tank body 35 from the front mounting stay 37 and the rear mounting stays 38L, 38R is dispersed to the upper half body 45 and the lower half body 46. Accordingly, the barrier sheet layer 36 can be effectively protected against an external force.

The mounting stay includes the front mounting stay 37 which is provided on the front portion of the fuel tank body 35 and the rear mounting stays 38L, 38R which are provided on the rear portion of the fuel tank body 35, and the front mounting stay 37 is disposed at the center portion of the upper half body 45 in the lateral direction, and the rear mounting stays 38L, 38R are disposed on the lower half body 46 in a left and right pair. With such a configuration, an external force is dispersed in the longitudinal direction from the front mounting stay 37 mounted on the front portion of the fuel tank body 35 and the rear mounting stays 38L, 38R mounted on the rear portion of the fuel tank body 35 and, at the same time, is dispersed to the upper half body 45 and the lower half body 46 thus acting on the upper bonding surface 47c and the lower bonding surface 48c. Accordingly, it is possible to effectively protect the barrier sheet layer 36. Further, the fuel tank body 35 is supported at three points, that is, at the front mounting stay 37 and the rear mounting stays 38L, 38R and hence, the fuel tank body 35 can be effectively and strongly mounted on the vehicle body frame F with the minimum configuration.

The front mounting stay 37 has the mounting hole 72 through which the tank fixing jig 39a fixed to the vehicle body frame F passes, and the front mounting stay 37 has the upper surface groove 71a and the lower surface groove 71b as the fragile portions in the vicinity of the mounting hole 72. The rear mounting stays 38L, 38R respectively have the mounting hole 82 through which the tank fixing jig 39b fixed to the vehicle body frame F passes, and the rear mounting stays 38L, 38R respectively have the grooves 83b, 83b which form the fragile portions in the vicinity of the mounting hole 82 respectively. With such a configuration, when an excessive external force acts on the front mounting stay 37 and the rear mounting stays 38L, 38R, the upper surface groove 71a and the lower surface groove 71b of the front mounting stay 37 and the grooves 83b, 83b of the left and right rear mounting stays 38L, 38R disposed at positions away from the upper bonding surface 47c and the lower bonding surface 48c are broken prior to the upper bonding surface 47c and the lower bonding surface 48c. Accordingly, it is possible to protect the barrier sheet layer 36 in the fuel tank body 35.

The fragile portions are formed of the upper surface groove 71a, the lower surface groove 71b, and the grooves 83b, 83b which are provided on the peripheries of the mounting holes 72, 82. With such a configuration, the fragile portions can be provided in a compact manner at positions remote from the upper bonding surface 47c and the lower bonding surface 48c. Accordingly, an external force which acts on the upper bonding surface 47c and the lower bonding surface 48c from the front mounting stay 37 and the left and right rear mounting stays 38L, 38R is reduced thus protecting the barrier sheet layer 36.

The upper bonding surface 47c is provided on the upper bonding portion 47 which is the flange portion extending toward the outside of the fuel tank body 35, and the front mounting stay 37 includes the reinforcing rib 74 which extends from the upper bonding portion 47. With such a configuration, strength and rigidity of the front mounting stay 37 can be increased by the upper bonding portion 47 and the reinforcing rib 74. Accordingly, the fuel tank body 35 can be strongly supported by the front mounting stay 37.

The lower bonding surface 48c is provided on the lower bonding portion 48 which is the flange portion extending toward the outside of the fuel tank body 35, and the rear mounting stays 38L, 38R respectively include the reinforcing ribs 83, 83 extending from the lower bonding portion 48. With such a configuration, strength and rigidity of the rear mounting stays 38L, 38R can be increased by the lower bonding portion 48 and the reinforcing ribs 83, 83. Accordingly, the fuel tank body 35 can be strongly supported by the rear mounting stays 38L, 38R.

According to the first embodiment to which the present invention is applied, the resin-made fuel tank 30 includes: the resin-made fuel tank body 35; the resin-made cylindrical filling portion 40 for filling a liquid, the cylindrical filling portion 40 provided on the fuel tank body 35; and the mouthpiece 41 engageable with the cylindrical filling portion 40, and capable of covering the inner peripheral surface 93a, the distal end surface 93b and the outer peripheral surface 93c of the cylindrical filling portion 40, wherein the fuel tank body 35 has the mouthpiece fixing portion 91 to which the mouthpiece fixing jig 42 for fixing the mouthpiece 41 to the fuel tank body 35 is fixed. The mouthpiece 41 has the annular skirt portion 110 which covers the outer peripheral surface 93c, the skirt portion 110 has the fitting portion 115 which is fitted on the upper portion 96 of the outer peripheral surface 93c on the upper portion thereof, and has the large diameter portion 116 having the diameter larger than the fitting portion 115 on the lower portion thereof, the mouthpiece 41 has the stay portion 113 extending from the large diameter portion 116 toward the outside of the mouthpiece 41 in the radial direction, and the fixing hole 121 through which the mouthpiece fixing jig 42 passes is provided in the stay portion 113.

With such a configuration, the mouthpiece 41 engageable with the cylindrical filling portion 40 is fixed to the mouthpiece fixing portion 91 of the fuel tank body 35 by the mouthpiece fixing jig 42 which passes through the fixing hole 121 formed in the stay portion 113 extending from the large diameter portion 116. Accordingly, the mouthpiece 41 can be easily mounted on or removed from the cylindrical filling portion 40 by mounting or removing the mouthpiece fixing jig 42. Further, the mouthpiece 41 has the large diameter portion 116 having the diameter larger than the diameter of the fitting portion 115 and hence, the mouthpiece 41 can be integrally moved with the stay portion 113 by an amount corresponding to the gap S1 formed between the large diameter portion 116 and the outer peripheral surface 93c of the cylindrical filling portion 40. Accordingly, even in the case where an error in size occurs in the manufacture of the cylindrical filling portion 40, the error can be absorbed by the movement of the mouthpiece 41. In this manner, the mouthpiece 41 can be mounted or removed while allowing an error in size in the manufacture of the cylindrical filling portion 40.

The fixing hole 121 has a diameter larger than a diameter of the mouthpiece fixing jig 42 so as to allow the movement of the mouthpiece 41 with respect to the cylindrical filling portion 40 by a predetermined distance in the radial direction of the cylindrical filling portion 40. With such a configuration, the mouthpiece 41 can be moved in the radial direction of the cylindrical filling portion 40 by an amount that the fixing hole 121 is movable with respect to the mouthpiece fixing jig 42. Accordingly, the mouthpiece 41 can be mounted or removed while allowing an error in size in the manufacture of the cylindrical filling portion 40.

The barrier sheet layer 36 provided for lowering permeation of a fuel stored in the fuel tank body 35 is provided on the inner surface of the fuel tank body 35, and the mouthpiece fixing portion 91 is the nut 99 embedded in the surface of the fuel tank body 35, and the mouthpiece fixing jig 42 is the mouthpiece fixing bolt 101 threadedly engageable with the nut 99, the nut 99 is embedded in the inner protruding portion 98 which projects toward the inside of the fuel tank body 35, and the distal end surface 98a of the inner protruding portion 98 has a semispherical convex shape. With such a configuration, the distal end surface 98a of the inner protruding portion 98 has a semispherical convex shape and hence, it is possible to prevent the concentration of a stress on the barrier sheet layer 36 provided on the distal end surface 98a of the inner protruding portion 98 and thereby a degree of freedom in arrangement of the mouthpiece fixing portion 91 can be enhanced.

A plurality of the mouthpiece fixing portions 91 may be disposed concentrically around the cylindrical filling portion 40 at a substantially equal interval. With such a configuration, an external force which acts on the mouthpiece fixing portion 91 can be effectively dispersed and hence, the concentration of a stress around the cylindrical filling portion 40 can be reduced.

The mouthpiece 41 has the peripheral rib 122 raised from the periphery of the stay portion 113, and the rib 122 is formed continuously between a plurality of the fixing holes 121 disposed on the periphery of the skirt portion 110. With such a configuration, strength and rigidity of the mouthpiece 41 can be enhanced and hence, the cylindrical filling portion 40 can be effectively protected by the mouthpiece 41.

The large diameter portion 116 has: the parallel portion 117 disposed parallel to the fitting portion 115; and the enlarged diameter portion 118 whose diameter is gradually increased from the fitting portion 115 to the parallel portion 117. With such a configuration, the gap S1 formed between the parallel portion 117 and the outer peripheral surface 93c of the cylindrical filling portion 40 can be easily controlled. Further, rigidity of the skirt portion 110 can be enhanced by the enlarged diameter portion 118 and hence, the cylindrical filling portion 40 can be effectively protected by the mouthpiece 41.

The cylindrical filling portion 40 has the finished portion 90 finished by machining on a portion thereof (the upper portion 96) on which the fitting portion 115 of the mouthpiece 41 is fitted. With such a configuration, the portion of the cylindrical filling portion 40 on which the fitting portion 115 of the mouthpiece 41 is fitted can be worked with high accuracy by machining. An error in size which occurs in machining can be absorbed by the movement of the mouthpiece 41.

The cylindrical filling portion 40 has the proximal end portion 95 which is covered by the large diameter portion 116 of the mouthpiece 41, and the outer diameter of the proximal end portion 95 is larger than the outer diameter of the portion (upper portion 96), of the cylindrical filling portion 40, which is covered by the fitting portion 115. With such a configuration, the proximal end portion 95 of the cylindrical filling portion 40 can have a large diameter corresponding to the large diameter portion 116 of the mouthpiece 41 and hence, strength and rigidity of the cylindrical filling portion 40 can be enhanced.

The seal member 92 is interposed between the fitting portion 115 of the mouthpiece 41 and the outer peripheral surface 93c of the cylindrical filling portion 40. With such a configuration, in the case where an error in size is absorbed by the movement of the mouthpiece 41, hermetic property between the fitting portion 115 and the outer peripheral surface 93c of the cylindrical filling portion 40 can be ensured because of deflection of the seal member 92.

Second Embodiment

Hereinafter, a second embodiment to which the present invention is applied is described with reference to FIG. 17 and FIG. 18. In this second embodiment, parts having substantially the same configuration as the above-mentioned first embodiment are given the same symbols and their description is omitted.

The second embodiment differs from the above-mentioned first embodiment in respect of the configuration of a mounting stay in conformity with a vehicle body frame F2.

Figure 17:
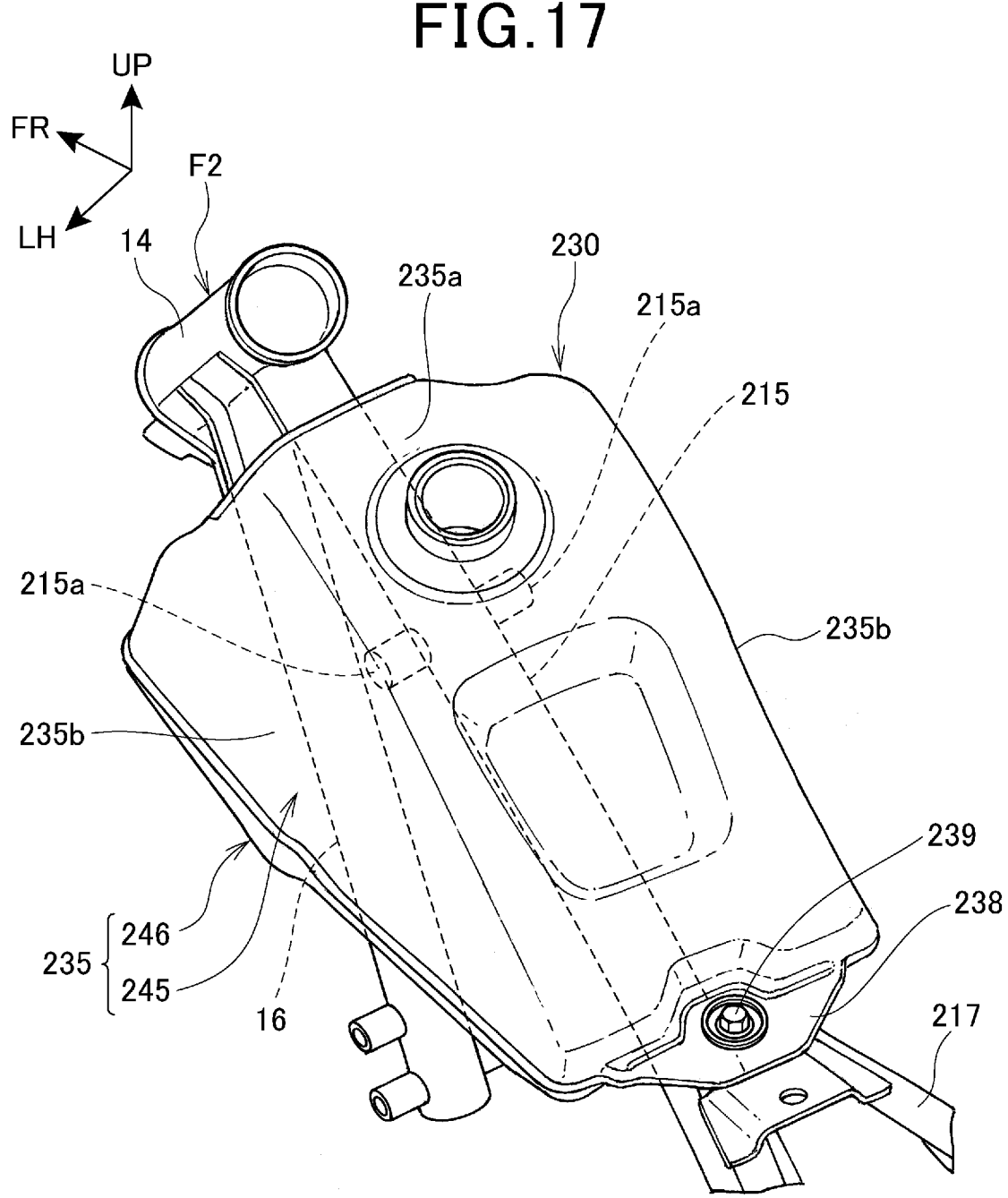
FIG. 17 is a perspective view of a mounting structure of a fuel tank according to a second embodiment as viewed from a left upper side.
Figure 18:
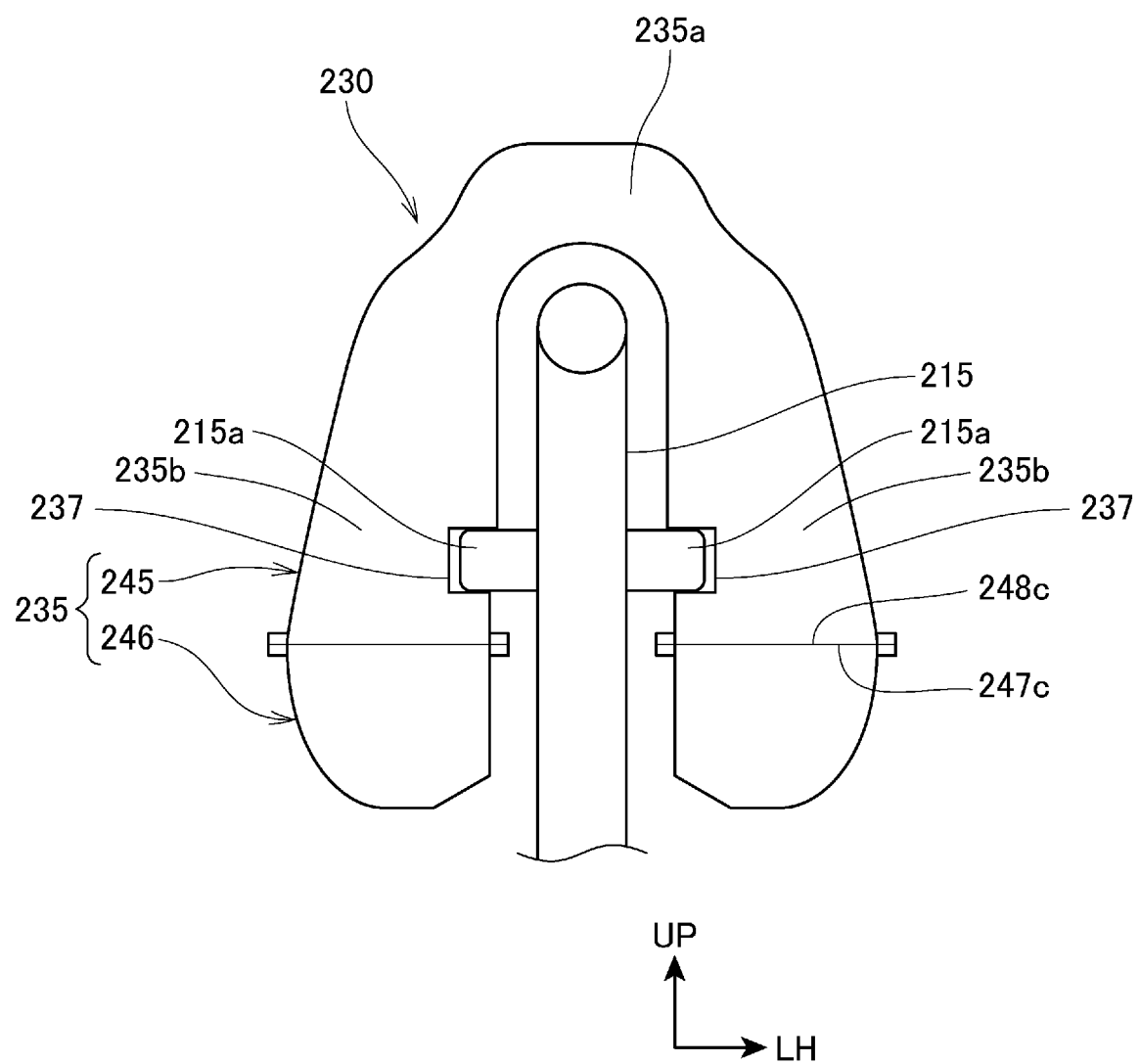
FIG. 18 is a schematic view of the mounting structure of the fuel tank as viewed from a front side.

FIG. 17 is a perspective view of a mounting structure of a fuel tank 230 according to a second embodiment as viewed from a left upper side. FIG. 18 is a schematic view of the mounting structure of the fuel tank 230 as viewed from a front side.

A motorcycle 201 includes the vehicle body frame F2, and a fuel tank 230. Although other parts of the motorcycle 201 are not shown in FIG. 17, the motorcycle 201 has substantially the same configuration as the motorcycle 1.

The vehicle body frame F2 includes a head pipe portion 14, one main frame 215 which extends rearward in a rearward and downward direction from the head pipe portion 14, a down frame 16, and a seat frame 217 which extends rearward from the main frame 215.

The main frame 215 has tank support portions 215a, 215a which protrude leftward and rightward respectively on side surfaces thereof.

The fuel tank 230 includes a fuel tank body 235, and a barrier sheet layer 36 (see FIG. 3).

The fuel tank body 235 is arranged so as to straddle the main frame 215 from above in the lateral direction, and is supported on the main frame 215.

The fuel tank body 235 includes: an upper portion 235a arranged above the main frame 215; and a pair of left and right side portions 235b, 235b which extends downward after passing along left and right sides of the main frame 215 from the upper portion 235a.

The fuel tank body 235 is formed into a tank shape by bonding an upper half body 245 and a lower half body 246 to each other at bonding surfaces 247c, 248c.

In the upper half body 245, on inner side surfaces of the side portions 235b, 235b, front mounting stays 237, 237 (mounting stay) in which tank support portions 215a, 215a are fitted are provided. A front portion of the fuel tank body 235 is mounted on the tank support portions 215a, 215a.

The front mounting stays 237, 237 are spaced apart from the bonding surfaces 247c, 248c in the upward direction. Accordingly, it is possible to prevent the barrier sheet layer 36 in the vicinity of the bonding surfaces 247c, 248c from being influenced by an external force from the front mounting stays 237, 237. Accordingly, it is possible to protect the barrier sheet layer 36 against an external force.

The upper half body 245 includes a rear mounting stay 238 extending rearward from a rear end portion thereof. A rear portion of the fuel tank body 235 is fixed to the vehicle body frame F2 by a tank fixing jig 239 which is made to pass through the rear mounting stay 238 from above.

The above-mentioned embodiments show one mode to which the present invention is applied, and the present invention is not limited to the above-mentioned embodiments.

In the above-mentioned embodiments, the description has been made by taking the upper half body 45 and the lower half body 46 as the example of the split bodies which form the fuel tank body 35. However, the present invention is not limited to the above-mentioned configuration, and the fuel tank body 35 may be split into three or more split bodies. For example, a fuel tank body may be formed by bonding the lower half body 46 to an upper half body which is formed of two split bodies.

In the above-mentioned embodiments, the description has been made by taking the motorcycle 1 as an example of a saddle riding vehicle. However, the present invention is not limited to the motorcycle 1, and the resin-made fuel tank according to the present invention is also applicable to various saddle riding vehicles such as a three-wheeled saddle riding vehicle provided with two front wheels or two rear wheels and a saddle riding vehicle provided with four or more wheels. Further, the present invention may be also applicable to a resin-made fuel tank other than the vehicle-use resin-made fuel tank.

REFERENCE SIGNS LIST

30: fuel tank (resin-made tank)
35: fuel tank body (tank body)
36: barrier sheet layer
40: cylindrical filling portion
41: mouthpiece
42: mouthpiece fixing jig (fixing jig)
90: finished portion
91: mouthpiece fixing portion (fixing portion)
92: seal member
93a: inner peripheral surface
93b: distal end surface
93c: outer peripheral surface
95: proximal end portion
96: upper portion (portion covered by fitting portion)
98: inner protruding portion (protruding portion)
98a: distal end surface
99: nut
101: mouthpiece fixing bolt (bolt)
110: skirt portion
113: stay portion
115: fitting portion
116: large diameter portion
117: parallel portion
118: enlarged diameter portion
121: fixing hole
122: peripheral rib (rib)

The invention claimed is:

1. A resin-made tank comprising: a resin-made tank body; a resin-made cylindrical filling portion for filling a liquid, the cylindrical filling portion being provided on the tank body; and a mouthpiece engageable with the cylindrical filling portion, and capable of covering an inner peripheral surface, a distal end surface and an outer peripheral surface of the cylindrical filling portion, wherein the tank body has a fixing portion to which a fixing jig for fixing the mouthpiece to the tank body is fixed, the mouthpiece has an annular skirt portion which covers the outer peripheral surface, the skirt portion has a fitting portion which is fitted on an upper portion of the outer peripheral surface on an upper portion of the skirt portion, and has a large diameter portion having a larger diameter than the fitting portion on a lower portion of the skirt portion, the mouthpiece has a stay portion extending radially outward of the mouthpiece from the large diameter portion, and a fixing hole, through which the fixing jig passes, is provided in the stay portion.

2. The resin-made tank according to claim 1, wherein the fixing hole has a diameter larger than a diameter of the fixing jig so as to allow movement of the mouthpiece with respect to the cylindrical filling portion by a predetermined distance in a radial direction of the cylindrical filling portion.

3. The resin-made tank according to claim 1, wherein a barrier sheet layer for lowering permeation of a fuel stored in the tank body is provided on an inner surface of the tank body, and the fixing portion is a nut embedded in a surface of the tank body, and the fixing jig is a bolt threadedly engageable with the nut, the nut is embedded in a protruding portion which protrudes toward an inside of the tank body, and a distal end surface of the protruding portion has a semispherical convex shape.

4. The resin-made tank according to claim 1, wherein the at least one fixing portions includes a plurality of the fixing portions which are disposed concentrically around the cylindrical filling portion at a substantially equal interval.

5. The resin-made tank according to claim 1, wherein the mouthpiece has a rib raised from a periphery of the stay portion, and the rib is formed continuously between a plurality of the fixing holes disposed on a periphery of the skirt portion.

6. The resin-made tank according to claim 1, wherein the large diameter portion has: a parallel portion disposed parallel to the fitting portion; and an enlarged diameter portion whose diameter is gradually increased from the fitting portion to the parallel portion.

7. The resin-made tank according to claim 1, wherein the cylindrical filling portion has a finished portion finished by machining on a portion where the fitting portion of the mouthpiece is fitted.

8. The resin-made tank according to claim 1, wherein the cylindrical filling portion has a proximal end portion which is covered by the large diameter portion of the mouthpiece, and an outer diameter of the proximal end portion is larger than an outer diameter of a portion, of the cylindrical filling portion, which is covered by the fitting portion.

9. The resin-made tank according to claim 1, wherein a seal member is interposed between the fitting portion of the mouthpiece and the outer peripheral surface of the cylindrical filling portion.

* * * * *